(12) United States Patent
Fujimoto et al.

(10) Patent No.: US 7,676,369 B2
(45) Date of Patent: Mar. 9, 2010

(54) CONVERSATION CONTROL APPARATUS, CONVERSATION CONTROL METHOD, AND PROGRAMS THEREFOR

(75) Inventors: Jun Fujimoto, Tokyo (JP); Shengyang Huang, Tokyo (JP); Hiroshi Katukura, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 778 days.

(21) Appl. No.: 10/993,884

(22) Filed: Nov. 19, 2004

(65) Prior Publication Data

US 2005/0144013 A1    Jun. 30, 2005

(30) Foreign Application Priority Data

Nov. 20, 2003    (JP)    ............................. 2003-391305

(51) Int. Cl.
     *G10L 21/00*      (2006.01)
     *G06F 17/27*      (2006.01)
     *G10L 15/00*      (2006.01)

(52) U.S. Cl. ........................... 704/270; 704/9; 704/231; 704/257; 704/275

(58) Field of Classification Search ............... 704/9, 704/231, 257, 258, 270, 275
See application file for complete search history.

(56) References Cited

U.S. PATENT DOCUMENTS 5,991,726 A * 11/1999 Immarco et al. ............ 704/270

(Continued)

FOREIGN PATENT DOCUMENTS

JP      11-119791      4/1999

OTHER PUBLICATIONS

Lathoud, G.; McCowan, I.A., "Location based speaker segmentation," Acoustics, Speech, and Signal Processing, 2003. Proceedings. (ICASSP '03). 2003 IEEE International Conference on, vol. 1, No., pp. I-176-I-179 vol. 1, Apr. 6-10, 2003.*

(Continued)

*Primary Examiner*—Richmond Dorvil
*Assistant Examiner*—Douglas C Godbold
(74) *Attorney, Agent, or Firm*—Jordan and Hamburg LLP

(57) ABSTRACT

The present invention is a conversation control apparatus for carrying out conversation control based on both speech content and conversation state and information acquired from outside, and carrying out natural responses. This apparatus comprises a conversation database storing a plurality of items of conversation topic specifying information, a conversation control unit for selecting a reply sentence using conversation topic specifying information determined using the conversation history and conversation information, and an environment recognition unit for acquiring environment recognition information, wherein the environment recognition unit generates event information based on acquired environment recognition information, and the conversation control unit selects a reply sentence based on the event information.

4 Claims, 23 Drawing Sheets

U.S. PATENT DOCUMENTS

| | | | |
|---|---|---|---|
| 5,995,935 A * | 11/1999 | Hagiwara et al. | 704/272 |
| 6,212,502 B1 * | 4/2001 | Ball et al. | 704/270 |
| 6,513,011 B1 * | 1/2003 | Uwakubo | 704/275 |
| 6,622,119 B1 * | 9/2003 | Ramaswamy et al. | 704/9 |
| 6,961,705 B2 * | 11/2005 | Aoyagi et al. | 704/275 |
| 7,058,577 B2 * | 6/2006 | Surace et al. | 704/270 |
| 7,107,217 B2 * | 9/2006 | Watanabe et al. | 704/270 |
| 7,158,934 B2 * | 1/2007 | Honda et al. | 704/244 |
| 7,212,971 B2 * | 5/2007 | Jost et al | 704/275 |
| 7,257,537 B2 * | 8/2007 | Ross et al. | 704/270 |
| 2002/0135618 A1 | 9/2002 | Maes et al. | |
| 2003/0028384 A1 * | 2/2003 | Kemp et al. | 704/275 |
| 2003/0110038 A1 * | 6/2003 | Sharma et al. | 704/270 |
| 2003/0117485 A1 | 6/2003 | Mochizuki et al. | |
| 2004/0024602 A1 * | 2/2004 | Kariya | 704/270 |
| 2004/0098265 A1 * | 5/2004 | Kelly et al. | 704/270 |
| 2005/0081160 A1 * | 4/2005 | Wee et al. | 715/755 |
| 2005/0203746 A1 * | 9/2005 | Obata | 704/270 |

OTHER PUBLICATIONS

"Emotion Recognition In Human-Computer Interaction", No. XP-002191161, IEEE Signal Processing Magazine, IEEE Inc., New York, US, vol. 18, No. 1, Jan. 2001, pp. 32-80.

* cited by examiner

| SPOKEN SENTENCE TYPE | | EXAMPLE OF DATA |
|---|---|---|
| DA | DECLARATION AFFIRMATIVE SENTENCE | I LIKE SATO |
| LA | LOCATION AFFIRMATIVE SENTENCE | I LIKE SERIOUS FACE AT BAT |
| NA | NEGATION AFFIRMATIVE SENTENCE | I DON'T LIKE TO TALK TO A PERSON WHO DOESN'T LIKE SATO |
| DQ | DECLARATION INTERROGATIVE SENTENCE | DO YOU LIKE SATO? |
| LQ | LOCATION INTERROGATIVE SENTENCE | WHICH PART OF SATO AT BAT YOU LIKE? |
| NQ | NEGATION INTERROGATIVE SENTENCE | IT IS A LIE THAT YOU LIKE SATO, ISN'T IT? |
| ... | ... | ... |

FIG.8

| TYPE OF JUDGMENT | DICTIONARY TO BE USED |
|---|---|
| D JUDGMENT | DEFINITIONAL EXPRESSION DICTIONARY |
| N JUDGMENT | NEGATIONAL EXPRESSION DICTIONARY |
| ... | ... |

FIG.9

| Topic Specifying Information | 1st Specifying Information | "nd Specifying Information | 3rd Specifying Information |
|---|---|---|---|
| Topic Specifying Information (="Seven Samurais") | Seven Samurais | * | * |
| | Seven Samurais | * | Interesting |
| | ... | ... | ... |
| Topic Specifying Information (="War") | War | * | * |
| | War | * | Interesting |
| | ... | ... | ... |
| Topic Specifying Information (="The Bodyguard") | The Bodyguard | * | * |
| | The Bodyguard | * | Interesting |
| | ... | ... | ... |

FIG. 12

| TYPE | CONTENTS |
|---|---|
| D | DECLARATION SENTENCE |
| T | DECLARATION SENTENCE IS SENTENCE CONSTITUTED BY TEMPORAL CONCEPT SUCH AS "WHEN" |
| L | DECLARATION SENTENCE IS SENTENCE CONSTITUTED BY LOCATIONAL CONCEPT SUCH AS "WHERE" |
| N | SENTENCE AT THE TIME WHEN DECLARATION SENTENCE IS DENIED |
| ... | ... |

810 — Topic Specifying Information (="Japanese Foods")
Upper Order Concept Topic Specifying Information (="dishes")
Lower Order Concept Topic Specifying Informaiton (="Kaiseki Dishes")
Synonyms (="Japanese Style F

| | | Reply Type | Content | Event Information Flag |
|---|---|---|---|---|
| 820 Topic Title 1-1 (Japanese Foods; *; Like) | Reply Sentence 1-1 | D A | We can serve good Japanese foods | "Happy", "Male" |
| | | | We can serve good and health Japanese foods | "happy", "Female" |
| | | | ... | ... |
| | Reply Sentence 1-2 | T A | We have Japanese foods that we can quickly serve you | "Happy", "Male" |
| | | | We have health Japanese foods that we can ... | "happy", "Female" |
| | | | ... | ... |
| | ... | ... | ... | ... |
| Topic Title 1-2 | ... | ... | ... | ... |
| ... | | | | |

830 (Content column group)  840 (Event Information Flag column group)

| Emotional Flag Type | Accumulative Value |
|---|---|
| Happyness | 3 |
| Angry | -2 |
| Sadness | 0 |
| Joy | 6 |

FIG.20(A)

| | Angry | Hated | Fear | Happy | Sad | Surprised |
|---|---|---|---|---|---|---|
| Speaker1 | 0 | 0 | 0 | 1 | 0 | 1 |
| Speaker2 | 0 | 1 | 0 | 0 | 0 | 0 |
| Speaker3 | 9 | 9 | 9 | 9 | 9 | 9 |
| ... | ... | ... | ... | ... | ... | ... |

FIG.20(B)

CONVERSATION CONTROL APPARATUS, CONVERSATION CONTROL METHOD, AND PROGRAMS THEREFOR

The present disclosure relates to subject matters contained in Japanese Patent Application No. 2003-391305 filed on Nov. 20, 2003, which are expressly incorporated herein by reference in its entireties.

BACKGROUND OF THE INVENTION

1. Field of the Invention

The present invention relates to a conversation control apparatus, conversation control method, and programs therefor, and in more detail relates to a conversation control apparatus, conversation control method, and programs therefor, for carrying out conversation control constituting a reply to a caller originating a call, using environment recognition information for a caller's facial recognition, position, characteristics and voice recognition etc.

2. Description of the Prior Art

In recent years, with increase in speed of digital signal processing developed and advanced as information processing means centered on computers, high level integration LSI manufacturing technology, and ultrafine high precision manufacturing technology for disk media such as DVDs as a background, conversation control technology has been provided making it possible to give machines natural sounding voices, and to understand words spoken by a person and to make an appropriate reply. An example of this type of conversation control technology is disclosed in Japanese Patent Laid-open No. 2002-358304.

With this type of conversation control technology, speech of a user (speaker) is acquired via a keyboard or the like, and conversation control is carried out based on only the content of the speech.

On the other hand, there is also provided technology for carrying out behavior control in a self-sustaining manner based on information other than speech content, such as voice and image of a user, etc. Technology for carrying out this type of self sustaining behavior control is disclosed, for example, in Japanese Patent Laid-open No. 2002-111981.

With this type of conversation control technology, making a reply considering factors other than speech content, for example, user expression, characteristics, age, etc., is not carried out.

Also, in technology for carrying out behavior control in a self sustaining manner based on information other than speech content, there is behavior control based on only recognition results obtained from outside, but with this technology past speech content is not taken into consideration, which results in unnatural behavior control. For example, in the event that the result of recognition obtained from outside is information saying "angry face", even if the conversation up until that point indicated a good relationship, behavior control will be carried out based only on "angry face".

The object of the present invention is to provide conversation control technology that carries out conversation control based on both speech content and conversation state, and information obtained from outside, and makes a more natural response.

SUMMARY OF THE INVENTION

As means for solving the above described problems, the present invention has the following characteristics.

A first aspect of the present invention provides a conversation control apparatus for outputting a response in reply to speech from a user.

This conversation control apparatus comprises conversation database means (conversation database) for storing specified information for a plurality of topics of conversation, conversation control means (conversation control unit) for storing a conversation history determined by previous conversations and previous replies and selecting a reply sentence using topic specifying information determined using the conversation history and conversation information, and environment recognition means (environment recognition unit) for acquiring environment recognition information, the environment recognition means generating event information based on acquired environment recognition information, and the conversation control means selecting a reply sentence based on the event information.

The "environment recognition information" mentioned here means information acquired from the speaker and/or a region close to the speaker, for example, information output by a CCD camera, infrared sensor or microphone fitted to the conversation control apparatus. "event information" means information, acquired by interpreting environment recognition information, indicating conditions outside the conversation control apparatus, and is information indicating, for example, emotion and gender of the speaker, speaker attributes and the speaker's proximity.

According to this conversation control apparatus, since conversation control is carried out based not only on content of the user's speech, but on information acquired from environment recognition means (for example, facial recognition, emotion estimation, gender recognition, age recognition, voice pattern recognition, speaker position recognition, etc.), it becomes possible to output a reply according to the conditions of the conversation.

A second aspect of the present invention provides a conversation control apparatus for outputting a response in reply to speech from a user.

This conversation control apparatus apparatus is comprised of conversation database means (conversation database) for storing specified information for a plurality of topics of conversation, conversation control means (conversation control unit) for storing a conversation history determined by previous conversations and previous replies and selecting a reply sentence using topic specifying information determined using the conversation history and conversation information, environment recognition means (environment recognition unit) for acquiring environment recognition information, and emotion condition information management means (emotion condition information management unit) for storing and updating emotion condition information indicating emotion of at least one of a character playing a part in the conversation control apparatus and the speaker, the emotion condition information management means updating emotion condition information in response to event information, and the environment recognition means generating event information based on acquired environment recognition information, and the conversation control means selecting a reply sentence based on the emotion condition information.

The "emotion condition information" mentioned here means information representing emotion of a character and/or the speaker. The "environment recognition information" and "event information" have the same meaning as in the first aspect.

According to the conversation control apparatus of this aspect, since conversation control is carried out based not only on content of the user's speech, but on information acquired from environment recognition means (for example, facial recognition, emotion estimation, gender recognition, age recognition, voice pattern recognition, speaker position recognition, etc.), it becomes possible to output a reply according to the conditions of the conversation, and it is possible to output an appropriate reply reflecting changes in emotion of a character and adapted to conditions of the conversation.

A third aspect of the present invention provides a conversation control method for outputting a response in reply to speech from a user.

This conversation control method comprises a step of previously storing a plurality of items of topic specifying information, one or a plurality of conversation titles determined for each topic specifying information, one or a plurality of reply sentences determined for each conversation title, and event information flags determined in response to the reply sentences, a step of acquiring environment recognition information from an environment outside a conversation control apparatus and generating event information from the environment recognition information, and a step of comparing conversation information and topic specifying information determined on the basis of a conversation history determined on the basis of previous conversations and previous replies, to obtain at least one conversation title determined using the topic specifying information, and selecting a reply sentence according to an event information flag corresponding to the event information from a plurality of reply sentences corresponding to conversation title.

The "environment recognition information" mentioned here means information acquired from the speaker and/or a region close to the speaker, for example, information output by a CCD camera, infrared sensor or microphone fitted to the conversation control apparatus. The word "event information" means information, acquired by interpreting environment recognition information, indicating conditions outside the conversation control apparatus, and is information indicating, for example, emotion and gender of the speaker, speaker attributes and the speaker's proximity.

According to this conversation control method, since conversation control is carried out based not only on content of the user's speech, but on information acquired from environment recognition means (for example, facial recognition, emotion estimation, gender recognition, age recognition, voice pattern recognition, speaker position recognition, etc.), it becomes possible to output a reply according to the conditions of the conversation.

A fourth aspect of the present invention provides a conversation control method for outputting a response in reply to speech from a user.

This conversation control method comprises a step of previously storing a plurality of items of topic specifying information, one or a plurality of conversation titles determined for each topic specifying information, and one or a plurality of reply sentences determined for each conversation title, a step of acquiring environment recognition information from outside and generating event information from the environment recognition information, a step of updating emotional condition information representing emotion of at least one of a character and a speaker according to the event information, a step of comparing conversation information and topic specifying information determined on the basis of a conversation history determined on the basis of previous conversations and previous replies, to obtain at least one conversation title determined using the topic specifying information, and selecting a reply sentence according to an event information flag corresponding to the event information from a plurality of reply sentences corresponding to conversation title, and selecting a reply sentence according to the event information and emotional condition information from a plurality of reply sentences corresponding to that conversation title.

The "emotion condition information" mentioned here means information representing emotion of a character and/or the speaker. The "environment recognition information" and "event information" have the same meaning as in the third aspect.

According to the conversation control method of this aspect, since conversation control is carried out based not only on content of the user's speech, but on information acquired from outside (for example, facial recognition, emotion estimation, gender recognition, age recognition, voice pattern recognition, speaker position recognition, etc.), it becomes possible to output a reply according to the conditions of the conversation, and it is possible to output an appropriate reply reflecting changes in emotion of a character and adapted to conditions of the conversation.

Additional objects and advantages of the invention will be set forth in the description which follows, and in part will be obvious from the description, or may be learned by practice of the invention. The objects and advantages of the invention may be realized and obtained by means of the instrumentalities and combination particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 8 is a drawing showing "spoken sentence type", a two character alphabetic code representing that spoken sentence type, and an example of a spoken sentence corresponding to that spoken sentence type.

FIG. 9 is a drawing showing a relationship between sentence type and a dictionary for determining that sentence type.

FIG. 12 is a drawing showing a data structure example for conversation title.

FIG. 13 is a drawing for describing an example of reply sentence type and content.

FIG. 14 is a drawing showing specific examples of a conversation title affixed with a particular topic specifying information, a reply sentence and an event information flag.

FIG. 20 is a drawing showing an example of stored content of an emotion state information management unit.

DESCRIPTION OF THE PREFERRED EMBODIMENTS

1. First Embodiment

A first embodiment of the present invention will be described below with reference to the drawings.

Figure 1:
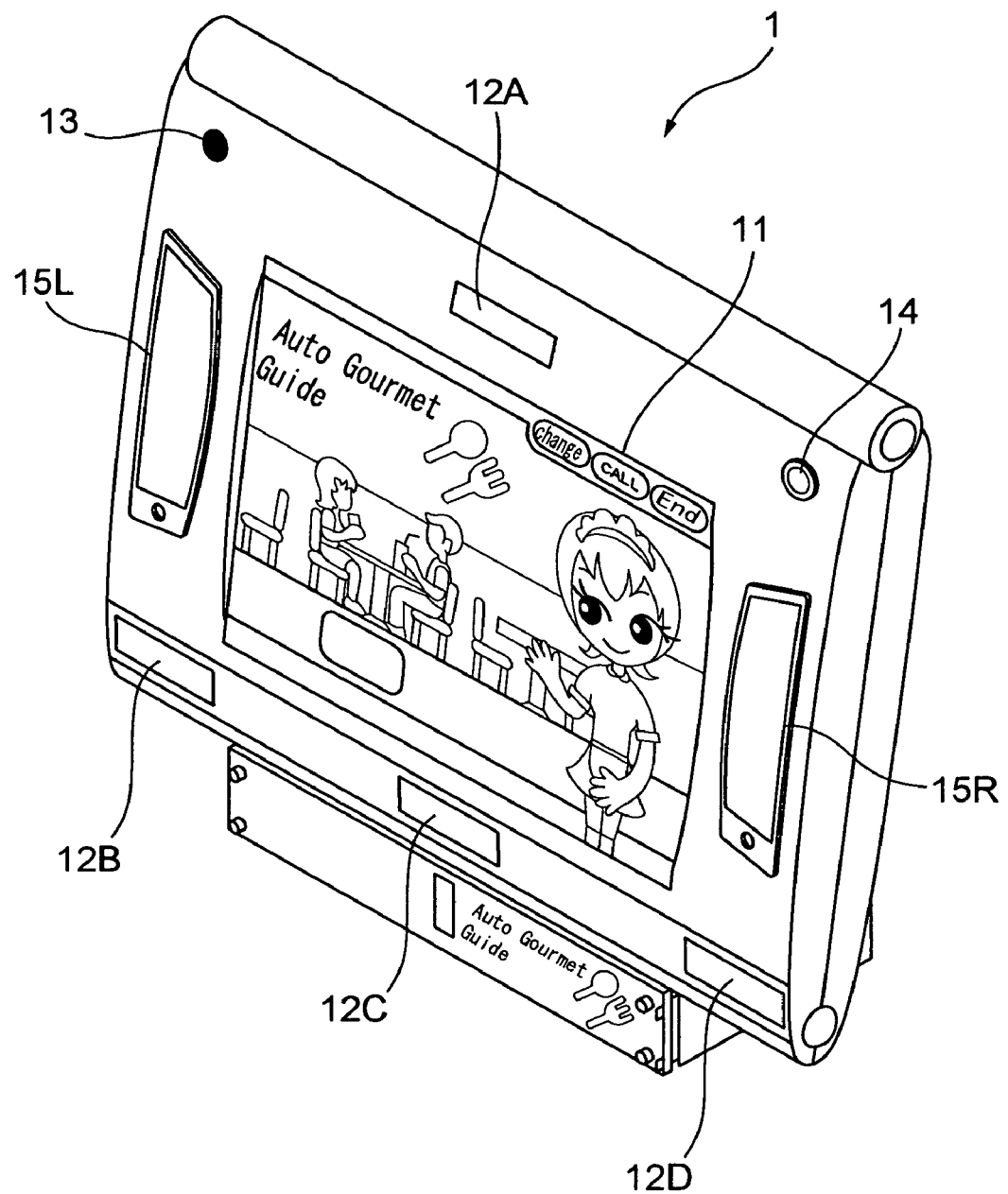
FIG. 1 is an external perspective drawing showing one example of a conversation control apparatus.

FIG. 1 is a perspective drawing showing the external device of a conversation control apparatus of this embodiment.

The conversation control apparatus 1 shown in the drawing functions as restaurant catering table order terminal placed on a table in a restaurant or the like for taking orders from a customer while responding to questions and orders of the customer (user).

The conversation control apparatus 1 comprises a liquid crystal display section 11 for displaying a user interface, 3D oriented microphones 12A, 12B, 12C and 12D functioning as input means for acquiring a speakers conversation and also functioning as sensors for carrying out speaker specification by specifying voice pattern and speaker position, a CCD camera 13 for capturing mainly an image of the speaker, an infrared sensor 14 for detecting proximity of a speaker, etc., and speakers 15L, 15R for outputting speech etc. generated by the conversation control apparatus for reply.

The conversation control apparatus 1 acquires a speakers speech by means of the 3D oriented microphones 12A, 12B, 12C and 12D. Also, environment recognition information is acquired by recognizing the outside using the 3D oriented microphones 12A, 12B, 12C and 12D, the CCD camera 13 and the infrared sensor 14. The conversation control apparatus 1 outputs a reply based on a speakers speech and environment recognition information. A response can be output as voiceprint information using the speakers 15L, 15R, or can be output as character and image data to the liquid crystal display section.

It is also possible for the conversation control apparatus 1 to display a user interface for taking user (customer) order selections on the liquid crystal display section, and to display amusement content that a user can play with until such time as food arrives after placing an order, such as, for example, psychological diagnosis content.

[Structural Example of Conversation Control Apparatus]

Next, the internal structure of the conversation control apparatus 1 will be described.

[Overall Structure]

Figure 2:
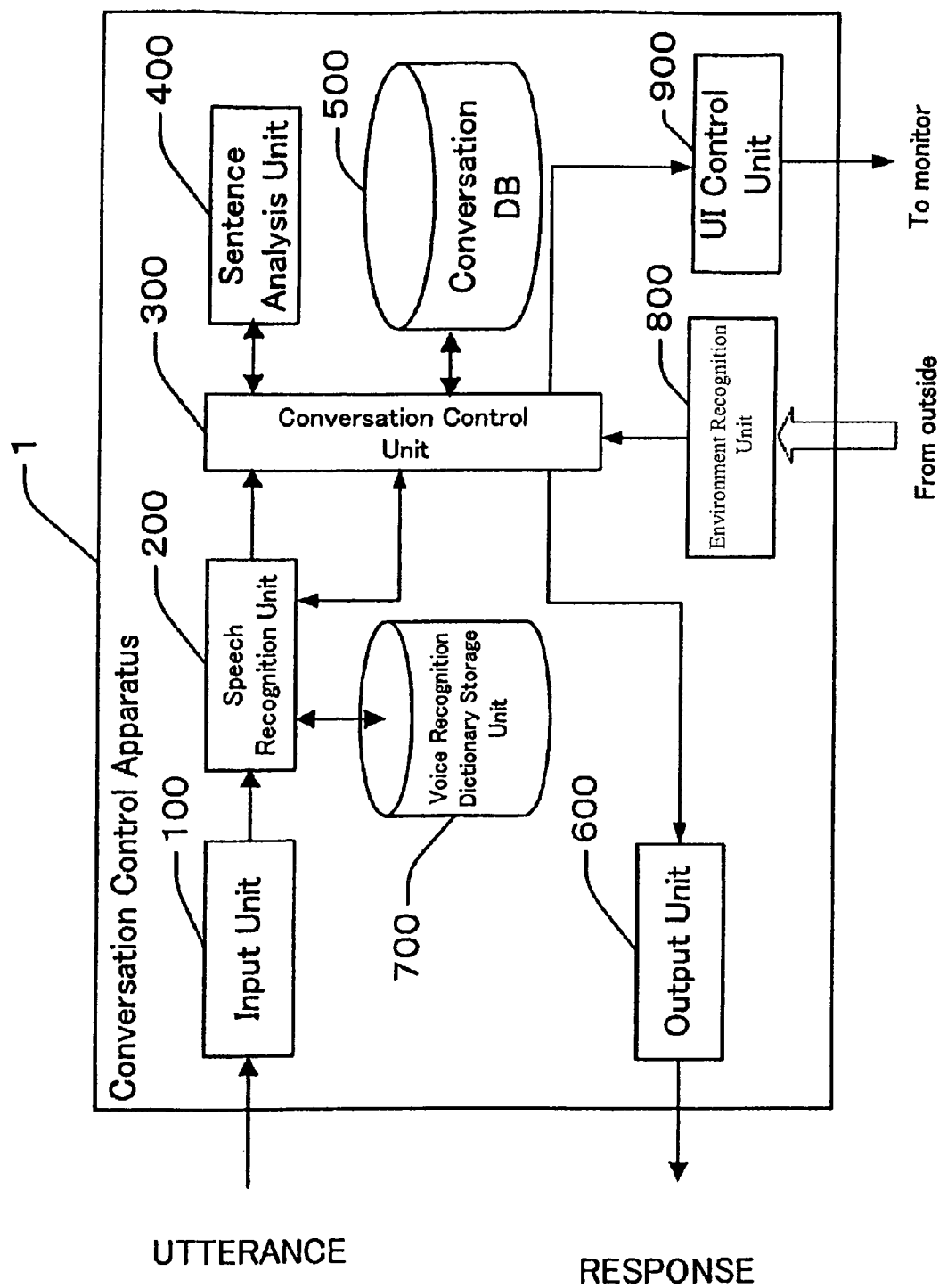
FIG. 2 is a functional block diagram showing an example structure of a conversation control apparatus.

FIG. 2 s a functional block diagram showing an example of the structure of a conversation control apparatus 1 of this embodiment.

The conversation control apparatus 1 has hardware equivalent to an information management unit or information processing unit such as a computer or work station fitted inside a chassis. The information processing unit of the conversation control apparatus 1 is comprised of a device having a central processing unit (CPU), a main memory (RAM), a read only memory (ROM), an input output unit (I/O) and an external storage unit such as a hard disk unit. A program for causing the information processing unit to function as a conversation control apparatus 1 or program for causing the computer to execute a conversation control method are stored in the ROM or the external storage unit, the program is loaded into the main memory and then either the conversation control apparatus 1 the conversation control method are realized through execution of the program by the CPU. Also, it is not absolutely necessary to store the program in the storage unit inside the apparatus, and it is possible for the program to be provided from a computer readable program storage medium such as a magnetic disk, optical disk, magneto-optical disc (CD) or DVD (Digital Versatile Disc) or an external unit (for example, and ASP (application service provider) server), and to load this program into the main memory.

As shown in FIG. 2, the conversation control apparatus 1 comprises an input unit 100, a speech recognition unit 200, a conversation control unit 300, a sentence analysis unit 400, a conversation database 500, an output unit 600, a voice recognition dictionary storage unit 700, an environment recognition unit 800, and a user interface control unit 900.

[Input unit]

The input unit 100 corresponds to the 3D oriented microphones 12A-12D, and acquires input information input from a user. The input unit 100 outputs voice corresponding to the acquired speech content to the speech recognition unit 200 as a voice signal. In the case where the input unit 100 is the 3D oriented microphones 12A-12D, the input unit 100 also functions as the environment recognition unit 800.

[Speech Recognition Unit]

The speech recognition unit 200 specifies a character string corresponding to speech content based on speech content acquired by the input unit 100. Specifically, the speech recognition unit 200 that is input with a voice signal from the input unit 100 references the dictionary stored in the voice recognition dictionary storage unit 700 and the conversation database 500 based on the input voice signal and outputs a voice recognition result speculated from the voice signal. With the structural example shown in FIG. 2, the speech recognition unit 200 requests acquisition of stored content of the conversation database 500 to the conversation control unit 300, and the conversation control unit 300 received stored content of the conversation database 500 acquired in response to the request, but it is also possible to have a structure where the speech recognition unit 200 directly acquires stored content of the conversation control database 500 and compares it with the voice signal.

[Structural Example of Speech Recognition Unit]

Figure 3:
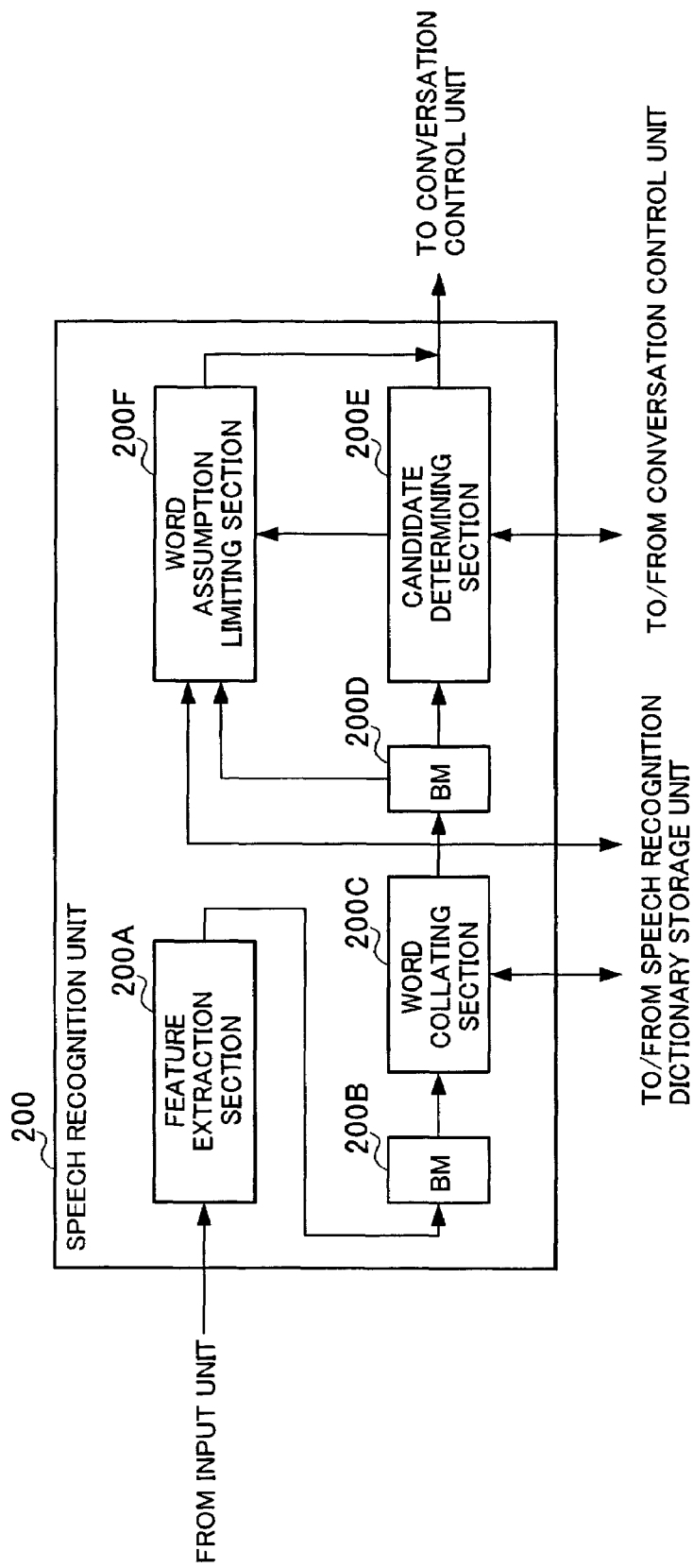
FIG. 3 is a functional block diagram showing an example structure of a speech recognition unit.

A functional block diagram showing a structural example of the speech recognition unit 200 is shown in FIG. 3. The speech recognition unit 200 comprises a feature extraction section 200A, a buffer memory (BM) 200B, a word collating section 200C, a buffer memory (BM) 200D, a candidate determination section 200E, and a word assumption limiting section 200F. The word collating section 200C and the word assumption limiting section 200F are connected to the voice recognition dictionary storage unit 700, and the candidate determination section 200E is connected to the conversation database 500.

The voice recognition dictionary storage unit 700 connected to the word collating section 200C stores a phoneme hidden markov model (hereafter the hidden markov model will be termed HHM). The phoneme HMM is represented including each state, and each state respectively has the following information. (a) state number, (b) receivable context class, (c) previous state and subsequent state list, (d) output probability density distribution parameter, and (e) self transition probability and probability of transition to subsequent state. The phoneme HMM used in this embodiment requires specification as to which speaker each distribution originates in, which means that a specific speaker mixture is converted and generated. Here, an output probability density function is a mixed Gaussian distribution having a 34 dimension diagonal covariance matrix. Also, the voice recognition dictionary storage unit 700 connected to the word collating section 200C stores a word dictionary. The word dictionary stores symbol strings representing readings represented by a symbol for each word of the phoneme HMM.

Voice spoken by a speaker is input to the feature extraction section 200A after being input to the microphone etc. and converted to a voice signal. After A/D conversion of the input voice signal, the feature extraction section 200A extracts a feature parameter and outputs the feature parameter. As a method for extracting the feature parameter and outputting the extracted feature, various methods can be considered, but as one example, for example, there is a method of executing LPC distribution, and extracting a 34 dimension feature parameter including logarithmic power, 16th order cepstrum coefficient, Δ logarithmic power and 16th order Δ cepstrum coefficient. The chronological order of the extracted feature parameter is input to the word collating section 200C via the buffer memory (BM) 200B.

The word collating section 200C detects a word assumption using the phoneme HMM stored in the voice recognition dictionary storage unit 700 and the word dictionary, and calculates and outputs a likelihood, based on the feature parameter input to the buffer memory 200B using a one-pass Viterbi decoding method. Here, the word collating section 200C calculates a likelihood within a word and a likelihood from the start of speech for every state of each HMM at each time. There is an individual likelihood for every different word identification number, word start time, and previous word. Also, in order to reduce the amount of calculation processing, it is possible to remove low likelihood grid assumptions from among all assumptions calculated based on the phoneme HMM and the word dictionary. The word collating section 200C outputs detected word assumptions and likelihood information for that assumption via the buffer memory 200D to the candidate determination section 200E and the word assumption limiting section 200F, together with time information from the time speech starts.

The candidate determination section 200E refers to the conversation control unit 300 to compare detected word assumptions with topic specifying information in a specified conversation space, determined whether or not there is a match with topic specifying information in the specified conversation space, within the word assumptions, and if there is a match outputs, the word assumption matching that information as a recognition result, while when there is no match, requests limiting of the word assumptions to the word assumption limiting section 200F.

An operational example of the candidate determination section 200E will now be described. The word collating section 200C outputs a word assumption, i.e., a plurality of assumed words, for example, "kantaku" (the word "kantaku" means reclamation by drainage in Japanese), "kataku" (the word "kataku" means a pretext in Japanese), and "kantoku", (the word "kantoku" means a director of a baseball team) and a likelihood (recognition rate). A specified conversation space relates to "films", and the word "kantoku (director)" is included in that topic pf conversation specific information, but the words "kantaku (drainage) and Kataku (pretext) are not. Also, regarding the likelihood (recognition rate) for "kantaku", "kataku", and "kantoku", it is extremely high for "kantaku", extremely low for "kantoku" and in between the two for "kataku".

Under the above described conditions, the candidate determination section 200E compares detected assumed words with topic specifying information in a specified conversation space to determine that the assumed word "kantoku" matches topic specifying information inside the specified conversation space, outputs the assumed word "kantoku" as a recognition result and sends the recognition result to the conversation control unit. As a result of this type of processing, "kantoku", connected with the topic of conversation "films" currently being handled, is given selection priority over the word assumptions "kantoku" and "kataku" having a higher order likelihood (recognition probability), and it is possible to output a voice recognition result that conforms to the content of that resulting conversation.

On the other hand, if there is no match, the word assumption limiting section 200F operates so as to output a recognition result in response to a request to carry out limiting of the assumed words from the candidate estimation section 200E. The word assumption limiting section 200F references a statistical language model stored in the voice recognition dictionary storage unit 700 based on a plurality of word assumptions output from the word collating section 200C via the buffer memory 200D, and for word assumptions for the same word having different equal finish times and equal start times, for every leading phoneme environment of the word, word assumption limiting is carried out so as to substitute with one word assumption having the highest likelihood, from among all likelihoods calculated from the time speech starts until the time the word is completed, and then from among a word string of all word assumptions after limiting, a word string for an assumption having the highest total likelihood is output as a recognition result. In this embodiment, preferably, the leading phoneme environment of the word to be processed means a three phoneme list including a final phoneme of a word assumption before the word, and two initial phonemes of the word assumption for the word.

Figure 4:
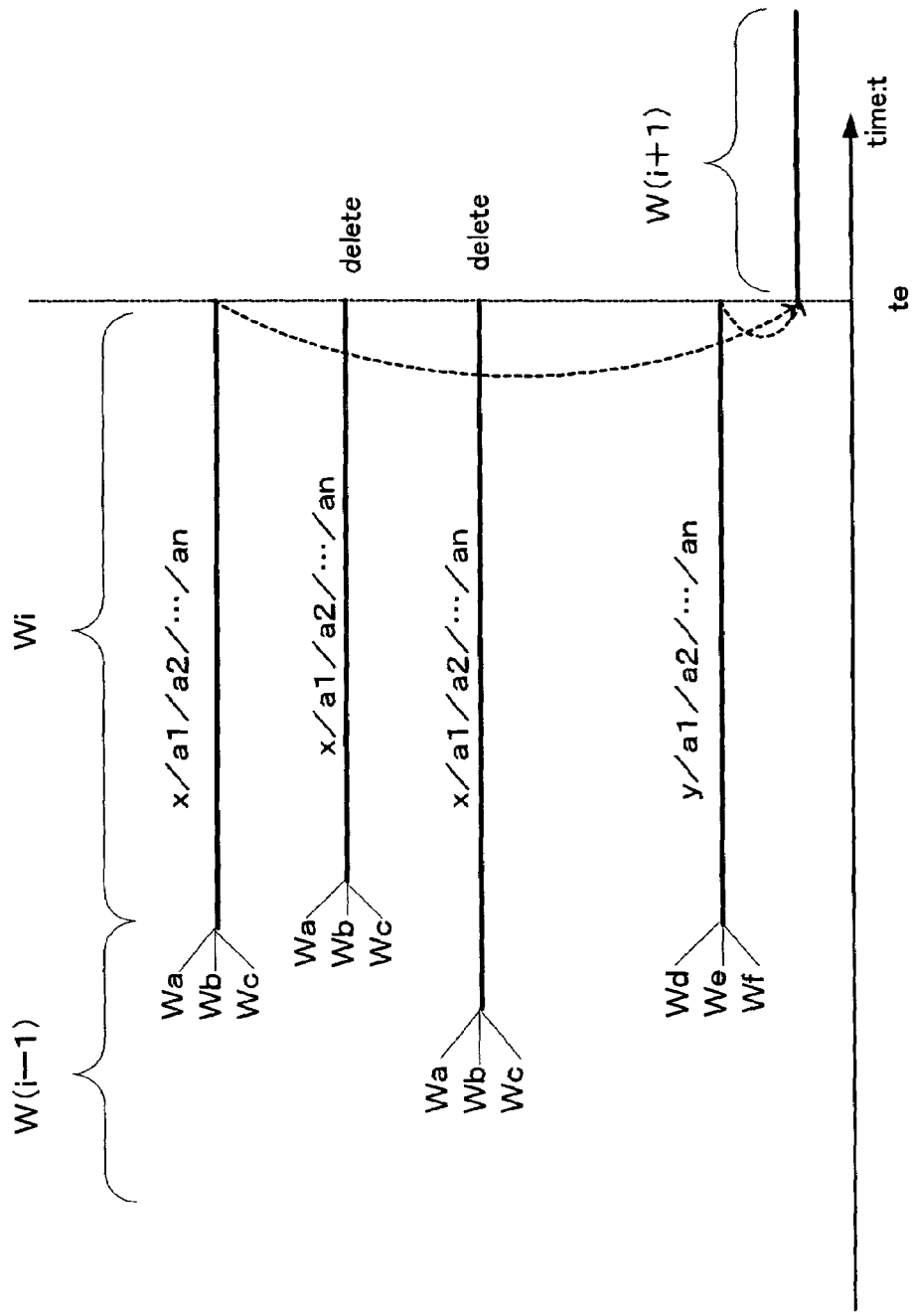
FIG. 4 is a timing chart showing processing for a word assumption narrowing section.

An example of word narrowing-down processing using the word assumption limiting section 200F will be described with reference to FIG. 3. FIG. 4 is a timing chart showing an example of processing of the word assumption limiting section 200F.

For example, after an $(i-1)^{th}$ word Wi−1, when an $i^{th}$ word Wi comprised of the phoneme string a1, a2, . . . arrives, 6 words Wa, Wb, Wc, Wd, We and Wf exist as word assumptions for the word Wi−1. Here, the final phoneme of the first three words Wa, Wb and Wc is /x/, and the final phoneme of the last three words Wd, We and Wf is /y/. At the time of completion te, if three assumptions assuming word assumptions Wa, Wb and Wc and one word assumption assuming word assumptions Wd, We and Wf remain, then from among the first three having the same leading phoneme environment one assumption having the highest likelihood remains and the rest are deleted.

Since an assumption assuming the word assumptions Wd, We and Wf has a leading phoneme environment that is different from the other three assumptions, that is, because the final phoneme of the preceding word assumption is not x but y, this assumption assuming the word assumptions Wd, We and Wf is not deleted. That is, one assumption remains for every final phoneme of the preceding word assumption.

In the above described embodiment, The leading phoneme environment of the word is defined as a three phoneme list including a final phoneme of a word assumption preceding the word and two initial phonemes of the word assumptions for the word, but the present invention is not thus limited, and it is also possible to have a phoneme list including a phoneme string for a word assumption a final phoneme of a preceding word assumption and at least one phoneme of a preceding word assumption consecutive to the final phoneme, and a phoneme string including an initial phoneme for a word assumption for the word.

In the above described embodiment, the feature extraction section 200A, the word collating section 200C, the candidate determination section 200E and the word assumption limiting section 200F are constituted by, for example, a computer such as a digital electronic computer, and the buffer memories 200B, 200D, and the voice recognition dictionary storage unit 700 are constituted by, for example, hard disc memory.

In the above described embodiment, voice recognition is carried out using the word collating section 200C and the word assumption limiting section 200F, but the present invention is not thus limited, and it is possible, for example, to configure a speech recognition unit for carrying out voice recognition for words by referencing a statistical language model using a phoneme checking section for referencing a phoneme HMM and a One Pass DP algorithm, for example.

Also, this embodiment has been described having the speech recognition unit 200 as part of a conversation control apparatus, but it is also possible to have an independent voice recognition unit, comprising a speech recognition unit, a voice recognition dictionary storage unit 700 and a conversation database 500.

[Operational Example for the Speech Recognition Unit]

Figure 5:
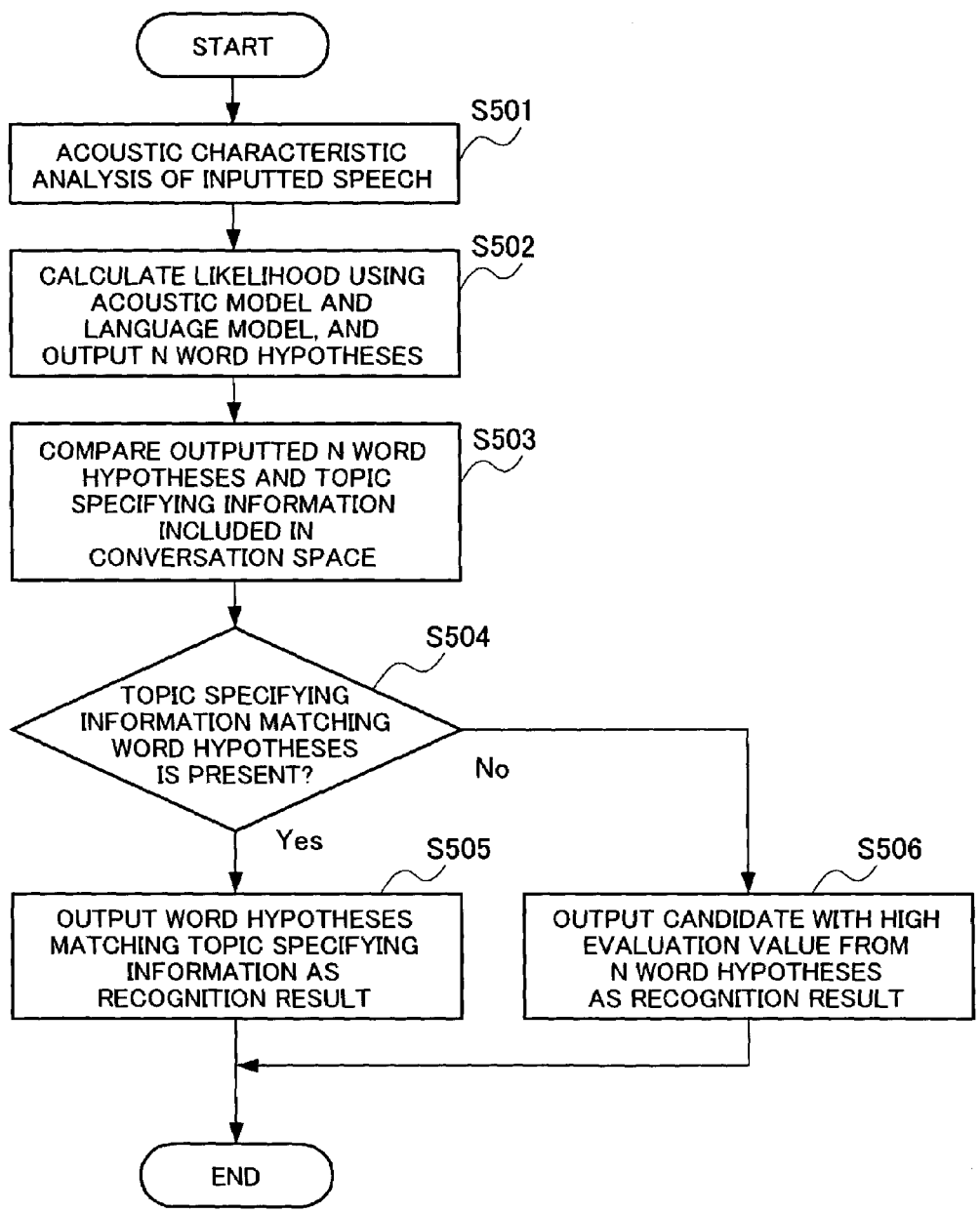
FIG. 5 is a flowchart showing an operation example of a speech recognition unit.

Next, a description will be given of the operation of the speech recognition unit 200 with reference to FIG. 5. FIG. 5 is a flowchart showing an operation example of the speech recognition unit 200. If a voice signal is received from the input unit 100, the speech recognition unit 200 carries out feature analysis of the input voice, and generates a feature parameter (step S501). Next, this feature parameter is compared with the phoneme HMM stored in the voice recognition dictionary storage unit 700 and the language model, to obtain a specified number of word assumptions and likelihoods for them (step S502). After that, the speech recognition unit 200 compares the acquired specified number of word assumptions, detected word assumptions and topic specifying information within a specified conversation space, and determines whether or not there is a match within the detected word assumptions with the topic specifying information within the specified conversation space (step S503 and step S504). In the event that there is a match, the speech recognition unit 200 outputs that matching word assumption as a recognition result (step S505). On the other hand, if there is no match, the speech recognition unit 200 outputs a word assumption having the largest likelihood as a recognition result, according to likelihood of the obtained word assumptions (step S506).

[Voice Recognition Dictionary Storage Unit]

Returning again to FIG. 2, description of the structural example of the conversation control apparatus 1 will be continued.

The voice recognition dictionary storage unit 700 stores character strings corresponding to a standard voice signal. The speech recognition unit 200 that has checked this defines a character string corresponding to assumption words corresponding to that voice signal, and outputs that defined character string as a character string signal to the conversation control unit 300.

[Sentence Analysis Unit]

Figure 6:
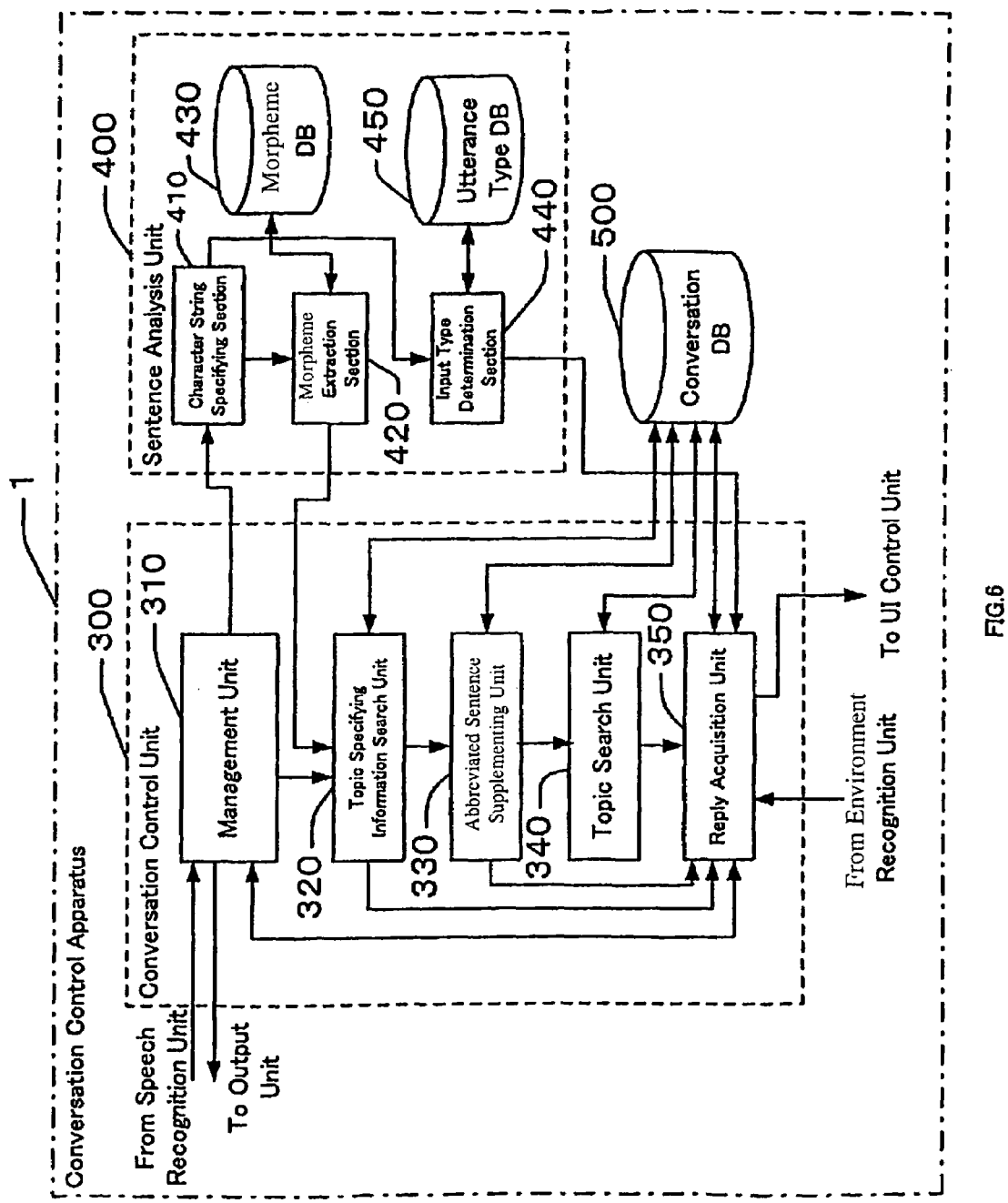
FIG. 6 is an enlarged block diagram of part of a conversation control apparatus.

Next, a description will be given of a structural example of the sentence analysis unit 400 with reference to FIG. 6. FIG. 6 is an enlarged block diagram of part of the conversation control apparatus 1, and is a block diagram showing a specific structural example of the conversation control unit 300 and the sentence analysis unit 400. Only the conversation control unit 300, sentence analysis unit 400 and the conversation database 500 are shown in FIG. 6, and other structural elements are omitted.

The sentence analysis unit 400 analyses character strings specified by the input unit 100 or the speech recognition unit 200. As shown in FIG. 6, with this embodiment the sentence analysis unit 400 comprises a character string specifying section 410, a morpheme extraction section 420, a morpheme database 430, an input type determination section 440 and an utterance type database 450. The character string specifying section 410 delimits a continuous character string specified by the input unit 100 or speech recognition unit 200 for each clause. This clause refers to the smallest segment into which it is possible to divide the character string without losing grammatical meaning. Specifically, when there is a time interval of a specified value or more within a continuous character string, the character string specifying section 410 delimits the character string at that section. The character string specifying section 410 outputs each delimited character string to the morpheme extraction section 420 and the input type determination section 440. "Character string" described below means a character string for each single clause.

[Morpheme Extraction Section]

Based on a character string of a clause delimited by the character string specifying section 410, the morpheme extraction section 420 extracts each morpheme constituting the smallest unit in a character string from within the character string for that clause and outputs as first morpheme information. Here, in this embodiment, a morpheme means the smallest unit of a word constituent indicated in the character string. As this smallest unit word constituent, there are parts of speech such as, for example, noun, adjective, verb, etc.

Figure 7:
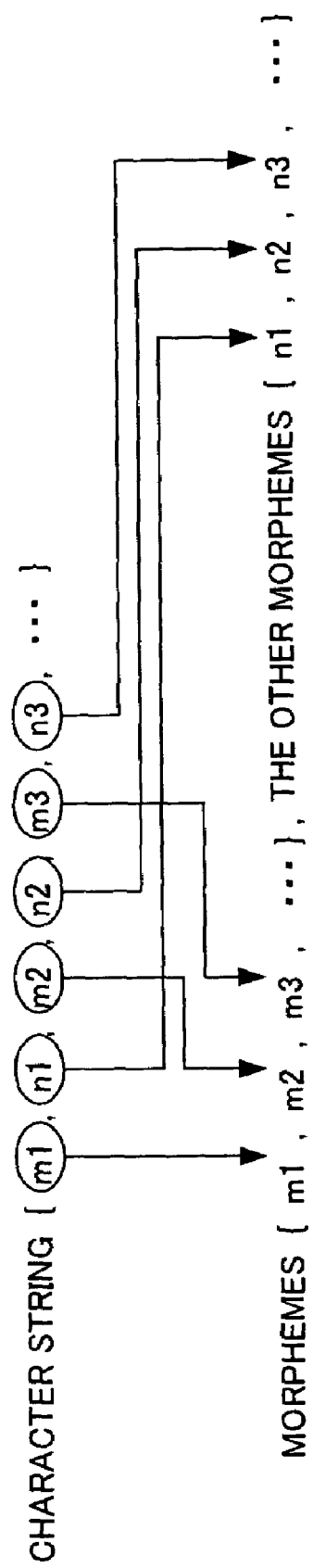
FIG. 7 is a drawing showing a relationship between a character string and appearance elements extracted from this character string.

With this embodiment, as shown in FIG. 7, each morpheme can represent m1. m2, m3 . . . . FIG. 7 is a drawing showing a relationship between a character string and morphemes extracted from this character string. As shown in FIG. 7, the morpheme extraction section 420 input with a character string from the character string specifying section 410 checks the input character string and a morpheme group (this morpheme group is provided as a morpheme dictionary defining keywords, reading, parts of speech, conjugation etc. of the morpheme for each morpheme belonging to respective parts of speech classifications) previously stored in the morpheme database 430. The morpheme extraction section 420 that has performed this check extracts each morpheme (m1, m2, . . . )

matching any of the previously stored morpheme group. Elements (n1, n2, n3 . . . ) other than the extracted morphemes might be, for example, auxiliary verbs.

This morpheme extraction section 420 outputs each extracted morpheme to the topic specifying information search section 320 as first morpheme information. The first morpheme information does not need to be structured. Here, "structured" means classifying and arranging morphemes contained in the character string based on parts of speech, for example, converting a character string in a spoken sentence so that morphemes are arranged in a specified order such as "subject+object+predicate" and converting to data. Obviously, even if structured first morpheme information is used, this is still within the scope of this embodiment.

[Input Type Determination Section]

The input type determination section 440 determines type (conversation type) of speech content based on a character strings specified by the character string specifying section 410. This conversation type is information specifying type of speech content, and with this embodiment means, for example, "spoken sentence type" shown in FIG. 8. FIG. 8 is a drawing showing examples of "spoken sentence type", and two character alphabetic codes representing that spoken sentence type, and a spoken sentence corresponding to that spoken sentence type.

Here, "spoken sentence type" in this embodiment is made up of declaration sentences (D: Declaration), time sentences (T: time), location sentences (L: Location) and negation sentences (N: negation) etc., as shown in FIG. 8. Sentences made up of each of these types are comprised of affirmative statements and question sentences. A "declaration sentence" means a sentence indicating the opinions or thoughts of a user. With this embodiment, as shown in FIG. 8, this declaration sentence may be, for example, "I like Sato". The "location sentence" means a sentence accompanying a locational concept. A "time sentence" means a sentence accompanying a temporal concept. A "negation sentence" means a sentence when negating a declaration sentence. Example sentences for the "spoken sentence type" are as shown in FIG. 7.

For the input type determination section 440 to determine "spoken sentence type", with this embodiment the input type determination section 440 uses a definition expression dictionary for determining that it is a declaration sentence and a negative expression dictionary for determining that it is a negation sentence, as shown in FIG. 9. Specifically, the input type determination section 440 that is input with a character string from the character string specifying section 410 checks that character string against each dictionary stored in the utterance type database 450, based on the input character string. The input type determination section 440 that has performed this check then extracts elements relating to each dictionary from within that character string.

This input type determination section 440 determines "spoken sentence type" based on the extracted elements. For example, in the event that elements being stated in a particular event are contained within a character string, the input type determination section 440 determines the character strings containing those elements to be a declaration sentence. The input type determination section 440 outputs the determined "spoken sentence type" to the reply acquisition section 350.

[Conversation Database]

Figure 10:
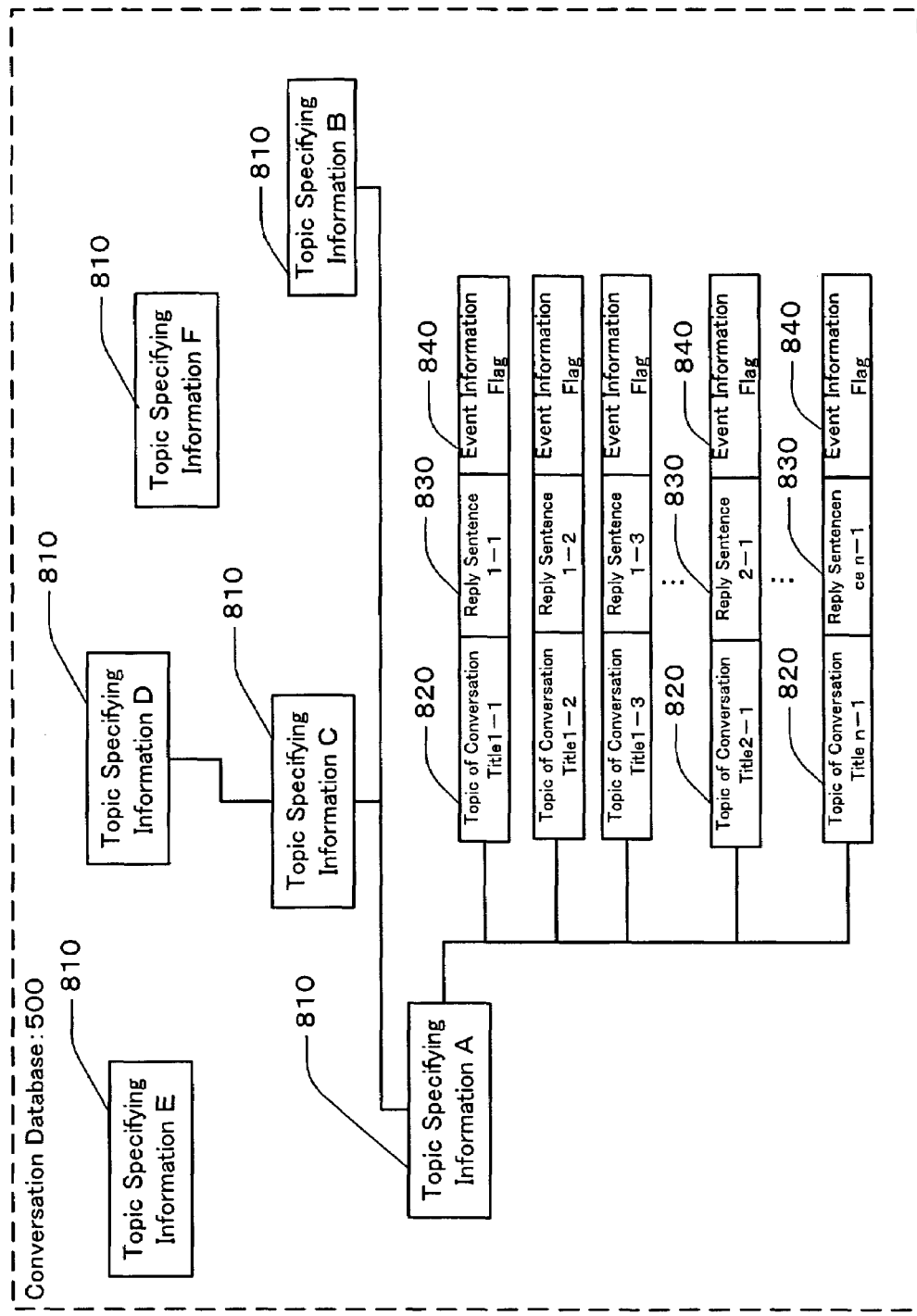
FIG. 10 is a schematic diagram showing one example of a data structure for data stored in the conversation database.

Next, a data structure example for data stored in the conversation database 500 will be described with reference to FIG. 10. FIG. 10 is a schematic drawing showing a structural example of data stored by the conversation database 500.

The conversation database 500 stores a plurality of items of topic specifying information 810 in advance for specifying a topic of conversation, as shown in FIG. 10. Alternatively, respective topic specifying information 810 may be related to other topic specifying information 810, for example, with the example shown in FIG. 10, the topic specifying information 810 is stored so that if topic specifying information C (810) is specified, other topic specifying information A (810), other topic specifying information B (810), and topic specifying information D (810) that are related to this topic specifying information C (810) are determined.

Specifically, with this embodiment, the topic specifying information 810 means a "keyword" that relates to anticipated input content or a reply sentence to a user if there is input from a user.

One or a plurality of conversation titles 820 are correlated and stored in the topic specifying information 810. The conversation title 820 is made up of phonemes comprising single characters, a plurality of character strings, or a combination of these. A reply sentence to a user is correlated and stored in each conversation title 820. Also, a plurality of reply types representing a type of reply sentence 830 are correlated to the reply sentence 830.

Further, an event information flag 840 is correlated to the reply sentence 830 and stored. The event information flag 840 is information generated based on environment recognition information obtained by the conversation control apparatus 1 performing recognition on the outside, and is made up of, for example, information estimating a user's emotions, information estimating a user's gender, information estimating a user's age, information detecting proximity of a user, or information identifying a user currently speaking.

The reply sentence 830 is provided for each event information flag 840, with a reply sentence 830 corresponding to an event information flag 840 indicating, for example, a "30 year old" "male" who is "angry", and a reply sentence 830 corresponding to an event information flag 840 indicating a "20 year old" "female" who is "laughing" are prepared having respectively different sentences.

Figure 11:
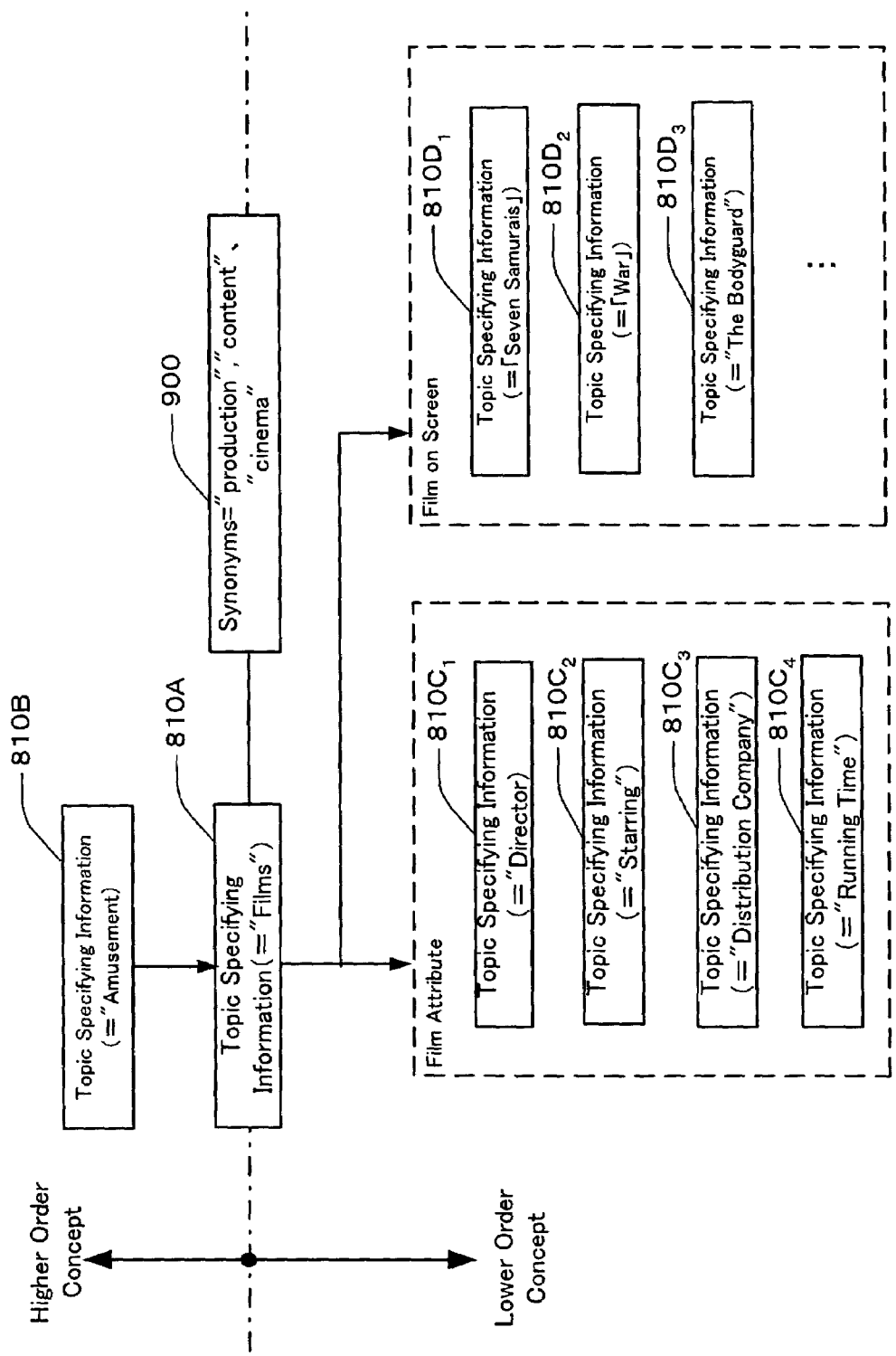
FIG. 11 is a drawing showing association between a particular item of topic specifying information and another item of topic specifying information.

Next, correlation between a particular topic specifying information 810 and another topic specifying information 810 will be described. FIG. 11 is a drawing showing correlation of particular topic specifying information 810A with other topic specifying information 810B, $810C_1$-$810C_4$, $810D_1$-$810D_3$, In the following description, "correlated and stored" means being able to read out particular information X and information that is correlated to that information X, for example, a state where information for reading out information Y in data of information X (for example, a pointer indicating a storage address for information Y, or a physical/logical memory address at which information Y is stored) means "information Y is 'correlated and stored' in information X".

With the example shown in FIG. 11, it is possible to correlate and store a higher level concept, a lower level concept, synonyms, and antonyms (omitted from the example of FIG. 11) between topic specifying information and other topic specifying information. With the example shown in FIG. 11, topic specifying information 810B (="amusement") is correlated to topic specifying information 810A and stored as higher order concept topic specifying information with respect to topic specifying information 810A (="films"), and is stored, for example, a layer above with respect to topic specifying information ("films").

Also, topic specifying information $810C_1$ (="director"), topic specifying information $810C_2$ (="starring"), topic specifying information $810C_3$ (="distribution company"), topic specifying information $810C_4$ (="running time"), and topic specifying information $810D_1$(="Seven Samurai"), topic specifying information $810D_2$ (="War"), topic specifying information $810D_3$ (="The Bodyguard") . . . for lower order concepts with respect to topic specifying information 810A (="films") are correlated to the topic specifying information 810A and stored.

Alternatively, synonyms 900 are correlated to the topic specifying information 810A. With this example, aspects storing "production", "content" and "cinema" are shown as synonyms for a keyword "films", being topic specifying information 810A. By determining these types of synonyms, when the keyword "film" is not contained in a conversation, but "production", "content" or "cinema" is contained in a spoken sentence etc. It is possible to handle as topic specifying information 810A being contained in the spoken sentence.

If particular topic specifying information 810 is specified, the conversation control apparatus 1 of this embodiment is capable of searching for and extracting other topic specifying information 810 that has been correlated to that topic specifying information 810 and stored, and a conversation title 820, reply sentence 830 etc. for that topic specifying information 810 rapidly by referencing stored content of the conversation database 500.

Next a data structure example for the conversation title 820 ("second morpheme information") will be described with reference to FIG. 12. FIG. 12 is a drawing showing a data structure example of the conversation title.

Topic specifying information $810D_1$, $810D_2$, $810D_3$, . . . respectively have a plurality of different conversation titles $820_1$, $820_2$, . . . , conversation titles $820_3$, $820_3$ . . . , and conversation titles $820_5$, $820_6$. With this embodiment, as shown in FIG. 12, respective conversation titles 820 are information made up of first specifying information 1001, second specifying information 1002, and third specifying information 1003. Here, the first specifying information 1001 means a primary morpheme making up a topic of conversation with this embodiment. An example of the first specifying information 1001 is, for example, a subject making up a sentence. Also, with this embodiment, the second specifying information 1002 means a morpheme having an intimate relationship to the first specifying information 1001. This second specifying information 1002 is, for example, an object. With this embodiment, the third specifying information 1003 means a morpheme representing movement or action of a particular object, or a morpheme for modifying a noun. This third specifying information 1003 can be, for example, a verb, adverb or adjective. The respective meanings of the first specifying information 1001, second specifying information 1002 and third specifying information 1003 are not necessarily limited as described above, and even if there are other meanings (other parts of speech) for the first specifying information 1001, second specifying information 1002 and third specifying information 1003, this embodiment is effective as long as sentence content can be understood from them.

For example, in the event that a subject is "Seven Samurai", and an adjective is "interesting", then as shown in FIG. 12, the conversation title $820_2$ is made up of the morpheme "Seven Samurai", being the first specifying information 1001, and the morpheme "interesting", being the third specifying information 1003. There is no morpheme corresponding to the second specifying information 1002 contained in this conversation title $820_2$, and a symbol "*" for indicating that there is no corresponding morpheme is stored as the second specifying information 1002.

This conversation title $820_2$ (Seven Samurai; *; interesting) has the meaning of "Seven Samurai is interesting".

Inside the parenthesis constituting the conversation title 820, the first specifying information 1001, second specifying information 1002 and third specifying information 1003 are arranged in order from the left. Also, within the conversation title 820, in the event that there are no morphemes contained from the first to the third specifying information, that section is shown as "*".

Specifying information making up the above described conversation title 820 is not limited to the three items of the first to third specifying information as has been described above, and it is also possible, for example, to have other specifying information (fourth specifying information, or more).

Next, a description is given of the reply sentence 830. As shown in FIG. 13, with this embodiment the reply sentence 830 is classified into type (reply type), being declaration (D: Declaration), time (T: Time), location (L: location) and negation (N: negation) in order to reply appropriately to the type of spoken sentence uttered by a user, and a reply is prepared for each type. Also, affirmative is termed "A", and a question is termed "Q".

In FIG. 14, a specific example is shown having a conversation title 820, reply sentence 830 and event information flag 840 appropriately attached to a particular topic specifying information 810 "Japanese food".

A plurality of conversation titles (820) 1-1, 1-2, . . . are appropriately attached to the topic specifying information 810 "Japanese Food". Reply sentences (830) 1-1, 1-2, . . . are appropriately attached to the respective conversation titles (820) 1-1, 1-2, . . . , and stored. Each reply sentence 830 is made up of a plurality of sentence prepared for every reply type, and event information flag 840.

For example, in the event that the conversation title (820) 1-1 is (Japanese food; *; like) {this has extracted a morpheme included in "I like Japanese food."}, for the case where the reply type is DA (declaration affirmative sentence) "Provides various tasty Japanese dishes" (reply for the case where event information flag 840 indicates that user estimated emotion is "happy" and user estimated gender is "male"), "Provides extremely healthy Japanese food." (reply for the case where event information flag 840 indicates that user estimated emotion is "happy" and user estimated gender is "female") etc. are prepared in the reply sentence (830) 1-1 corresponding to that conversation title (820) 1-1, and for the case where the reply type is TA (time affirmative) "Also provides Japanese dishes that can be served quickly." (reply for the case where event information flag 840 indicates that user estimated emotion is "happy" and user estimated gender is "male"), "Also provides healthy Japanese dishes that can be served quickly." (reply for the case where event information flag 840 indicates that user estimated emotion is "happy" and user estimated gender is "female") etc. are prepared. For other conversation types also, a plurality of replies are prepared according to the event information flag 840. A reply acquisition unit 350, that will be described later, acquires one reply sentence 830 correlated to that conversation title 820 according to the reply type and event information flag 840.

[Conversation Control Unit]

Here, returning to FIG. 6, a structural example of the conversation control unit 300 will be described.

The conversation control unit 300 controls delivery of data between each structural element (speech recognition unit 200, sentence analyzing unit 400, conversation database 500, output unit 600, speech recognition dictionary storage unit 700, environment recognition unit 800 and user interface control unit 900) inside the conversation control apparatus 1, and has a function for carrying out determination and output of a reply sentence in response to an utterance.

In this embodiment, the conversation control unit 300 comprises a management unit 310, a topic specifying information search unit 320, an abbreviated sentence supplementing unit 330, a topic search unit 340, and a reply acquisition unit 350. The management unit 310 carries out overall control of the conversation control unit 300. Also, the management unit 310 stores a conversation history, and has a function to update the conversation history as required. The management unit 310 functions to deliver all or part of the stored conversation history to each of the topic specifying information search unit 320, abbreviated sentence supplementing unit 330, topic search unit 340 and reply acquisition unit 350 in response to requests from these units.

The "conversation history" is information specifying a subject of a conversation between a user and the conversation control apparatus, and the conversation history is information including at least one of "noted topic specifying information", "noted topic title", "user input sentence topic specifying information", and "reply sentence topic specifying information". Also, "noted topic specifying information", "noted topic title", and "reply sentence topic specifying information" contained in the conversation history are not limited to being determined by an immediately prior conversation, and it is also possible to have "noted topic specifying information", noted topic title" and reply sentence topic specifying information" over a specified period, or to cumulatively store them.

In the following, each of the units constituting the conversation control unit 300 will be described.

[Topic Specifying Information Search Unit]

The topic specifying information search unit 320 collates first morpheme information extracted by the morpheme extraction unit 420 and each item of topic specifying information, and searches for topic of conversation specific information 810 from within each topic specifying information that matches a morpheme making up the first morpheme information. Specifically, in the case where the first morpheme information input from the morpheme extraction unit 420 is two morphemes "Japanese food" and "like", the topic specifying information search unit 320 collates the input first morpheme information and topic specifying information.

When a morpheme (for example "Japanese food") making up the first morpheme information is contained in a noted conversation title 820 focus (conversation title searched up to the previous time), the topic specifying information search unit 320 that has carried out this collating outputs that noted conversation title 820 to the reply acquisition unit 350. On the other hand, when a morpheme making up the first morpheme information is not contained in a noted conversation title 820 focus, the topic specifying information search unit 320 determines user input sentence topic specifying information based on the first morpheme information, and outputs the input first morpheme information and the user input sentence topic specifying information to the abbreviated sentence supplementing unit 330. "User input sentence topic specifying information" means conversation topic specifying information 810 equivalent to a morpheme corresponding to content that a user has made a topic of conversation, or conversation topic specifying information 810 equivalent to a morpheme having a possibility of corresponding to content that a user has made a topic of conversation, from within morphemes contained in the first morpheme information.

[Abbreviated Sentence Supplementing Unit]

The abbreviated sentence supplementing unit 330 generates a plurality of types of "supplemented first morpheme information", by using conversation topic specifying information 810 (hereafter called noted conversation topic specifying information) searched up to the time before and conversation topic specifying information 810 (hereafter called reply sentence conversation topic specifying information) contained in the previous sentence. For example, in the event that an uttered sentence is a sentence "I like", the abbreviated sentence supplementing unit 330 includes noted conversation topic specifying information "Japanese food" in the first morpheme information "like", to generate supplemented first morpheme information "Japanese food, like".

That is, if the first morpheme information is made "W", and the collection of noted conversation topic specifying information and reply sentence conversation topic specifying information is made "D", the abbreviated sentence supplementing unit 330 includes elements of the collection "D" in the first morpheme information "W" to generate the supplemented first morpheme information.

By doing this, in cases such as where a sentence constructed using the first morpheme information is an abbreviated sentence and not clear in its meaning, the abbreviated sentence supplementing unit 330 can use the collection "D" to include elements of that collection "D" (for example, "Japanese food") in the first morpheme information "W". As a result, the conversation control unit 300 can make the first morpheme information "like" into supplemented first morpheme information "Japanese food, like". The supplemented first morpheme information "Japanese food, like" corresponds to speech content "I like Japanese food.".

Specifically, the abbreviated sentence supplementing unit 330 can supplement an abbreviated sentence using the collection "D" even in cases such as where the user's speech content is an abbreviated sentence. As a result, even if a sentence formed from the first morpheme information is an abbreviated sentence, the abbreviated sentence supplementing unit 330 can turn this sentence into a comprehensible or non-abbreviated sentence even.

The abbreviated sentence supplementing unit 330 searched for a conversation title 820 that matches the first morpheme information after supplementation based on the collection "D". In the event that a conversation title 820 that matches the first morpheme information after supplementation is found, the abbreviated sentence supplementing unit 330 outputs that conversation title 820 to the reply acquisition unit 350. The reply acquisition unit 350 can then output the reply sentence 830 most appropriate to the user's speech content based on the appropriate conversation title 820 searched by the abbreviated sentence supplementing unit 330.

The abbreviated sentence supplementing unit 330 is not limited to only including the elements of the collection "D" in the first morpheme information, and it is also possible to include morphemes included any of first specifying information, second, second specifying information and third specifying information constituting that topic of conversation topic in extracted first morpheme information, based on noted conversation title.

[Topic Search Unit]

When conversation title 820 is not determined by the abbreviated sentence supplementing unit 330, the topic search unit 340 collates first morpheme information and conversation title 820 corresponding to conversation topic specifying information contained in the user input sentence (hereinafter referred as "user input sentence conversation topic specifying information"), and searches for the conversation title 820 that is most appropriate to the first morpheme information from in each conversation title 820.

Specifically, based on user input sentence conversation topic specifying information included in the input search instruction signal and first morpheme information, the topic search unit 340 that has been input with a search instruction signal from the abbreviated sentence supplementing unit 330 searches for the conversation title 820 most appropriate to that first morpheme information from in each conversation title 820 correlated to that user input sentence conversation topic specifying information. The topic search unit 340 outputs that searched conversation title 820 to the reply acquisition unit 350 as a search result signal.

FIG. 14 is a drawing showing a specific example of conversation title 820, reply sentence 830 and event information flag 840 correlated to particular conversation topic specifying information 810 (="Sato"). As shown in FIG. 14, for example, since conversation topic specifying information 810 (="Japanese food") is included in input first morpheme information "Japanese food, like", the topic search unit 340 specifies that conversation topic specifying information 810 (="Japanese food"), and then collates each conversation title (820) 1-1, 1-2, . . . correlated to that conversation topic specifying information 810 (="Japanese food") and the input first morpheme information "Japanese food, like".

The topic search unit 340 specifies the conversation title (820) 1-1 (Japanese food; *; like) from among conversation titles (820) 1-1, 1-2, that matches the input first morpheme information "Japanese food, like" based on this collation result. The topic search unit 340 outputs the searched conversation title (820) 1-1 (Japanese food; *; like) to the reply acquisition unit 350 as a search result signal.

[Reply Acquisition Section]

Based on the conversation title 820 searched by the topic search unit 340, the reply acquisition unit 350 acquires a reply sentence 830 correlated to that conversation title 820.

Also, based on the conversation title 820 searched by the topic search unit 340, the reply acquisition unit 350 collates each reply type correlated to that conversation title 820 and conversation type determined by the input type determination unit 440, and also collates event information output by the environment recognition unit 800 and event information flag 840 correlated to the reply sentence 830, to select one reply sentence corresponding to a reply type and event information flag 840 that coincides with the conversation type and event information.

As shown in FIG. 14, for example, in the event that the conversation title 820 searched by the topic search unit 340 is conversation title 1-1 (topic of conversation; *; like), the reply acquisition unit 350 specifies a conversation type (DA) that matches the "uttered sentence type" (for example DA) determined by the input type determination unit 440 from in reply sentence 1-1 (DA, TA, etc.) correlated to that conversation title 1-1, and specifies event information flag 840 (for example "happy", male) that matches the event information output by the environment recognition unit 800. The reply acquisition unit 350 that has specified this reply type (DA) and event information flag 840 acquires reply sentence ("Various tasty Japanese dishes are provided"))) correlated to that reply type (A) and event information flag 840 (for example, "happy", male) based on the specified reply type (DA) and event information 850.

Here, from within the above mentioned "DA", "TA" etc. "A" means affirmative. Accordingly, if "A" is included in the conversation type and reply type, it represents affirmative for a particular matter. It is also possible to include types such as "DQ", "TQ" in the conversation type and reply type. The "Q" in "DQ" and TQ" means that there is a question regarding a particular matter.

When the reply type is formed from the above described question type (Q), a reply sentence correlated to this reply type is formed with an affirmative type (A). As a reply sentence formed with this affirmative type, there is a sentence replying to a question asked. For example, if an uttered sentence is "Do you have any recommended dishes?", a conversation type for this uttered sentence is question type (Q). A reply sentence correlated to this question type (Q) might be, for example, "Yes, the meat dishes are highly recommended." affirmative type (A).

On the other hand, when the sentence type is made from an affirmative type (A), the reply sentence correlated to this reply type is made with a question type (Q). As a reply sentence formed with this question type, there might be a question sentence asked in return to speech content, or a question sentence eliciting a specified matter. For example, if the uttered sentence is "I like fish dishes." The conversation type for this uttered sentence is affirmative (A). A reply sentence correlated to this affirmative type (A) might be, for example, "How do you like your fish prepared?" (question sentence (Q) to elicit a specified mater).

The reply acquisition unit 350 outputs the acquired reply sentence 830 to the management unit 310 as a reply sentence signal. The management unit 310 input with the reply sentence signal from the reply acquisition unit 350 outputs the input reply sentence signal to the output unit 600.

The output unit 600 outputs the reply sentence acquired by the reply acquisition unit 350. This output unit 600 is speakers 15L, 15R, for example. Specifically, the output unit 600 that has been input with the reply sentence from the management unit 310 outputs that reply sentence, for example, "Various Japanese dishes are provided" in voice form based on the input reply sentence.

[Event Information Flag]

Figure 15:
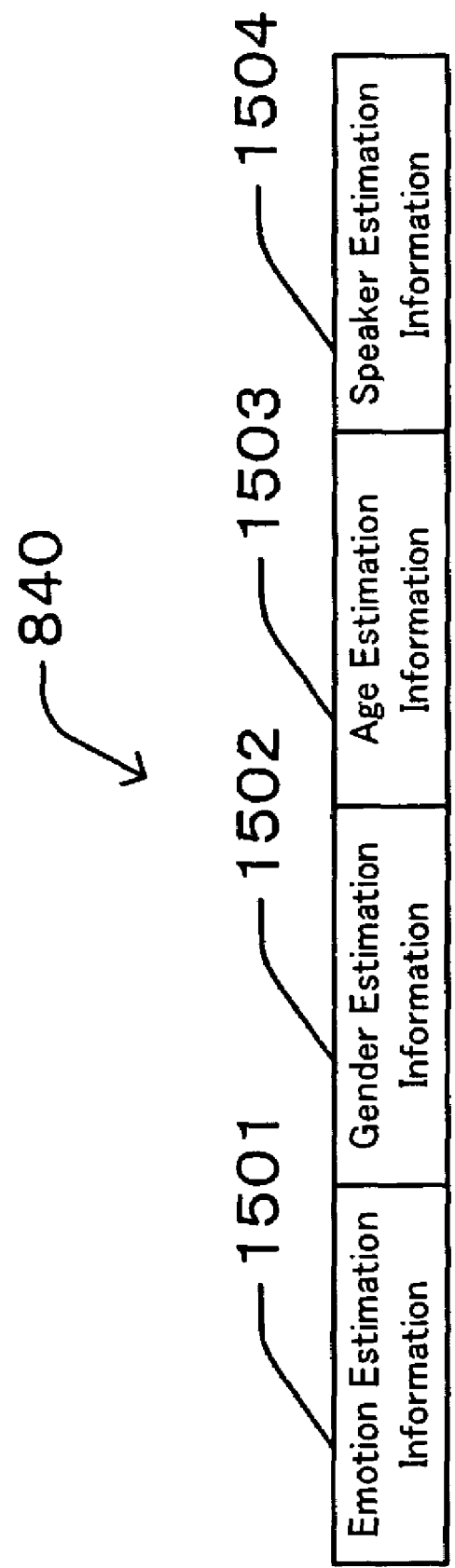
FIG. 15 is a drawing showing another data structure example for an event information flag.

FIG. 15 shows a structural example of the event information flag 840 that is different from the event information flag 840 shown in FIG. 14. The event information flag 840 in FIG. 15 has emotion estimation information 1501, gender estimation information 1502, age estimation information 1503, and speaker estimation information 1504. The emotion estimation information 1501 is information representing an estimate of a speaker obtained by estimation from facial image data and voice data etc. of the user, the gender estimation information 1502 is information representing the gender of a speaker obtained by estimation from speaker image data, voice data etc., the age estimation information 1503 is data representing a speaker's age acquired by estimation from speaker image data, voice data etc., and the speaker estimation information 1504 is information specifying a speaker currently speaking when there are a plurality of speakers.

[Environment Recognition Unit]

Returning to FIG. 2, a structural example of the conversation control apparatus 1 will be described.

Figure 16:
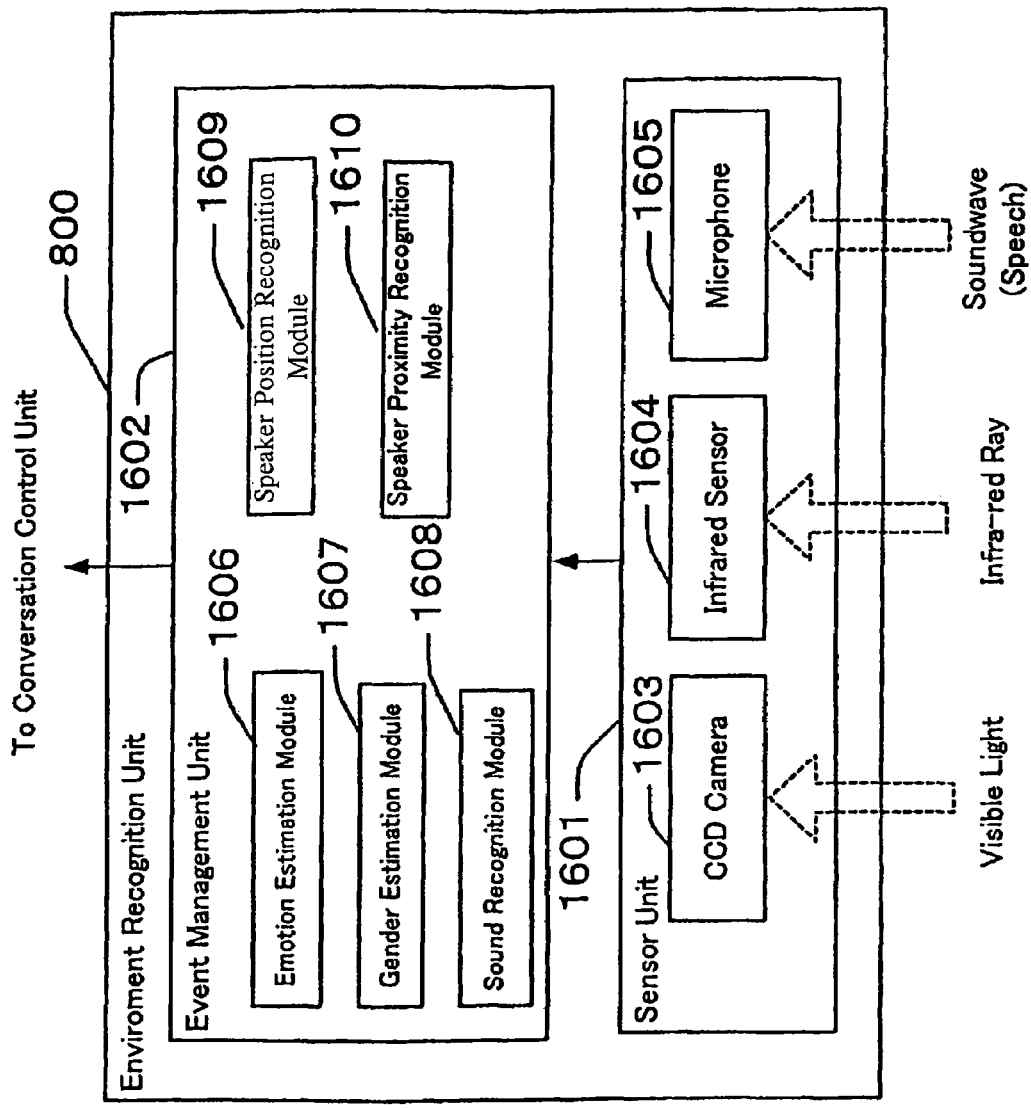
FIG. 16 is a functional block diagram showing an example structure of an environment recognition unit.

The conversation control apparatus 1 has an environment recognition unit 800. FIG. 16 shows a structural example of the environment recognition unit 800. The environment recognition unit 800 in FIG. 16 comprises a sensor unit 1601 for acquiring environment recognition information, which is external information, and an event management unit 1602 for receiving environment recognition information from the sensor unit 1601, and generating and outputting event information by carrying out processing to analyzing and observe this information.

The sensor unit 1601 comprises a CCD camera 1603, an infrared sensor 1604 and a microphone 1605. The CCD camera 1603 takes in light from outside the conversation control apparatus 1 and converts to particular image data which is one item of environment recognition information or output. The infrared sensor 1604 takes in infrared light from outside the conversation control apparatus 1, and outputs an infrared detection result as one item of environment recognition information. The microphone 1605 takes in sound (voice) from outside the conversation control apparatus 1 and provides output as one item of environment recognition information. Also, the microphone 1605 can be capable of specifying a position or direction of a sound source as one item of environment recognition information using orientation of the microphone.

The event management unit 1602 has a function of outputting event information based on environment recognition information output by the sensor unit 1601. The event information is information corresponding to the previously described event information flag 840, and is, for example, emotion estimation information, gender estimation information, age information or speaker estimation information.

The event management unit 1602 comprises an emotion estimation module 1606, a gender estimation module 1607, a sound recognition module 1608, a speaker position recognition module 1609 and a speaker proximity recognition module 1610.

Figure 17:
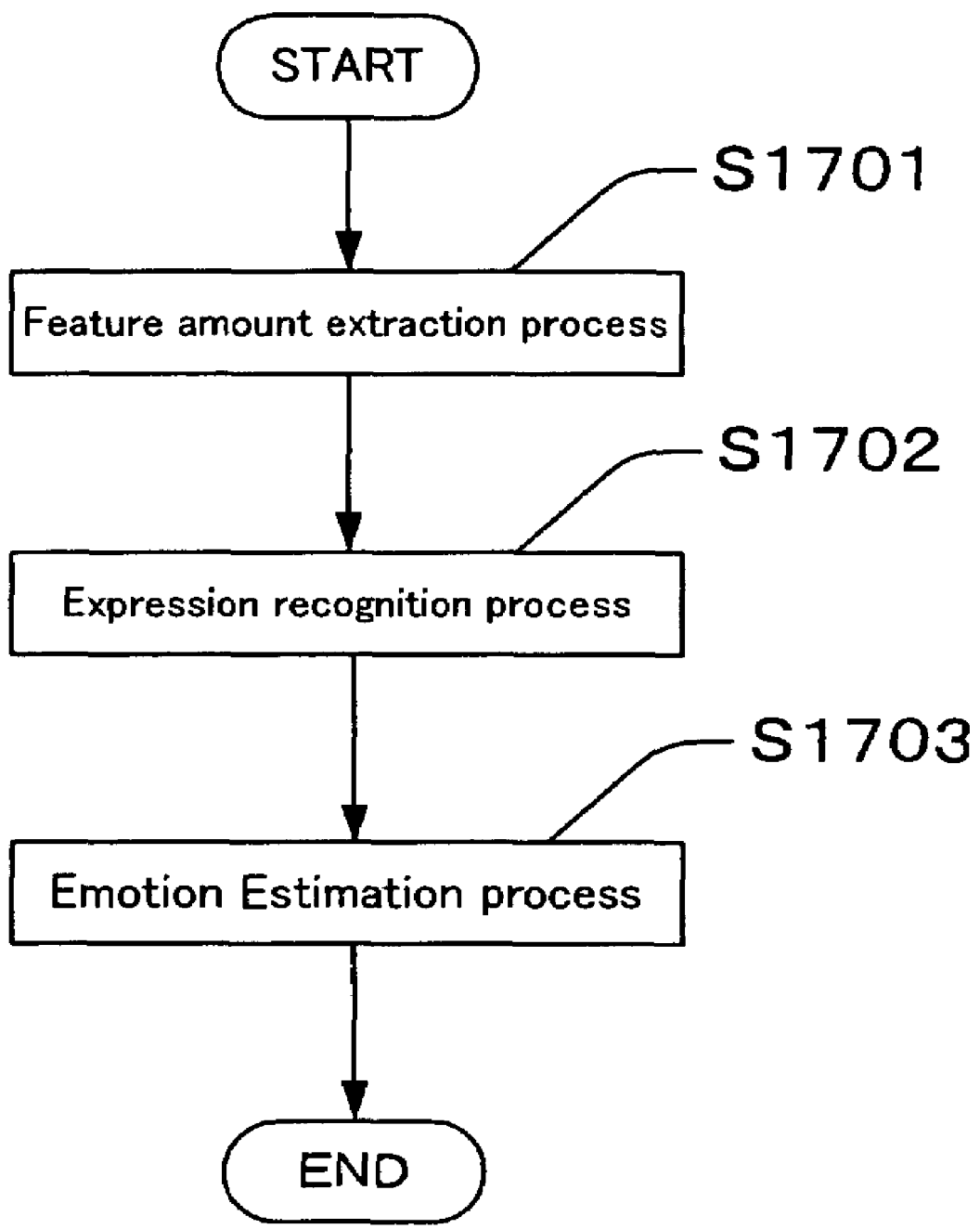
FIG. 17 is a flowchart showing example operation of an emotion estimation module.

The emotion estimation module 1606 estimates speaker emotion from a speaker image output from the sensor unit 1601, and outputs estimated emotion as event information. FIG. 17 is a flowchart showing an example of emotion estimation processing carried out by the sensor unit 1601.

If speaker image data is received from the sensor unit 1601 the emotion estimation module 1606 carries out feature amount extraction to extract a feature amount that can be calculated from feature points set on parts of a speaker's face (eyes, eyebrows, mouth, etc.) based on speaker image data (step S1701). "Feature points" are points set on part of a face that enable recognition of changes in expression, namely expressions such as anger, dislike, fear, happiness, sadness, or surprise, and may be points on both eyebrows and in the center of the eyebrows, points on both eyes, a vertical eye size, points on both lips and a vertical lip size. "feature amount" is an amount calculated from these feature points (for example distance), and can be a distance between eyebrows and eyes, or a distance between eyes and lips.

Next, the emotion estimation module 1606 carries out expression recognition processing to recognize a speaker's expression based on the extracted feature amount (step S170) First of all, characteristic expressive motions for basic expression (such as anger, dislike, fear, happiness, sadness and surprise) and neutral expressions are registered in advance as changes in feature amount for upper parts of the face (regions including left and right eyebrows), central parts of the face (region including left and right eyes) and lower parts of the face (region including the nose and mouth) For example, with a "surprised" expression, expressive movements such as raising of the eyebrows are displayed as characteristic expressive movements on the face. If this expressive movement is treated as a variations in feature amount, there is no variation in feature amount A, being a distance between eyebrows, but there is variation in feature amount such as increase in feature amount B, C and D, being eye height, eyebrow point, and distance between central points. Changes in expression are stored as changes in feature amount for similar changes in expression.

The emotion estimation module 1606 carries out emotion estimation processing to calculate changes in feature amount from feature amount extracted in step S1701, specify expression change corresponding to change in feature amount from a relationship between the above described pre-stored change in feature amount and expression change, estimate the expression of a current (latest) speaker and output the estimation result (step S1703). The estimation result is output as event information.

Next, a description is given of the gender estimation module 1607. The gender estimation module 1607 functions to estimate a speaker's gender from a speaker's image output by the sensor unit 1601 and outputs the estimated gender as event information. Processing to estimate the gender from the speaker's image is carried out as described below, for example. A feature point is automatically extracted and a feature amount calculated from facial image data of the speaker. Next, a feature amount for a previously learned class (for example, male, female) and the calculated feature amount are compared, and gender is determined by determining which class it is close to. The gender estimation module 1607 outputs an estimation result of the above mentioned gender estimation processing as event information.

Next, a description is given of the voice recognition module 1608. The voice recognition module 1608 functions to acquire voiceprint information from a voice signal output from the microphone 1605 and specify a speaker using this voiceprint information. Speaker specification specifies a current speaker from among past users. It is possible to acquire a past conversation topic specifying information etc. or alternatively in the event that a plurality of speakers use the same conversation control apparatus 1 (for example, when users gathered in a group use a single conversation control apparatus 1 arranged on a table), voiceprint information is acquired and compared so as to specify respective users. The voice recognition module 1608 outputs this speaker specifying information as event information.

Next, a description is given of the speaker position recognition module 1609. The speaker position recognition module 1609 obtains speaker position (or angle with respect to the conversation control apparatus) using orientation of the microphone 1605 of the sensor unit 1601, and thus specifies the speaker. In the event that a plurality of speakers use the conversation control apparatus 1 at the same time (for example, when users gathered in a group use a single conversation control apparatus 1 arranged on a table), the speaker position recognition module 1609 specifies respective users, and outputs information specifying the users as event information. In this way, in the event that there are a conversation 1 (speaker A), conversation 2 (speaker B), conversation 3 (speaker C) and a conversation 4 (speaker D), the conversation control unit 300 manages a conversation history for the respective speakers (speakers A, B, C and D), and outputs reply sentences based on the respective conversation histories.

Next, a description is given of the speaker proximity recognition module 1610. The speaker proximity recognition module 1610 determines whether or not a particular speaker is close enough to the conversation control apparatus 1 to speak using a detectable region of the infrared sensor 1604 of the sensor unit 1601, and in this way estimates that a speaker will have a conversation. If there is a speaker in the detectable region of the infrared sensor 1604, the infrared sensor 1604 (sensor unit 1601) outputs a proximity detection signal as environment recognition information. The speaker proximity recognition module 1610 receiving proximity detection information, being this environment recognition information, outputs speaker proximity notification information as event information. The conversation control unit 300 receiving the above described speaker proximity notification information outputs an introductory reply sentence such as, for example, "welcome" or "are you ready to order?".

2. Conversation Control Method

Figure 18:
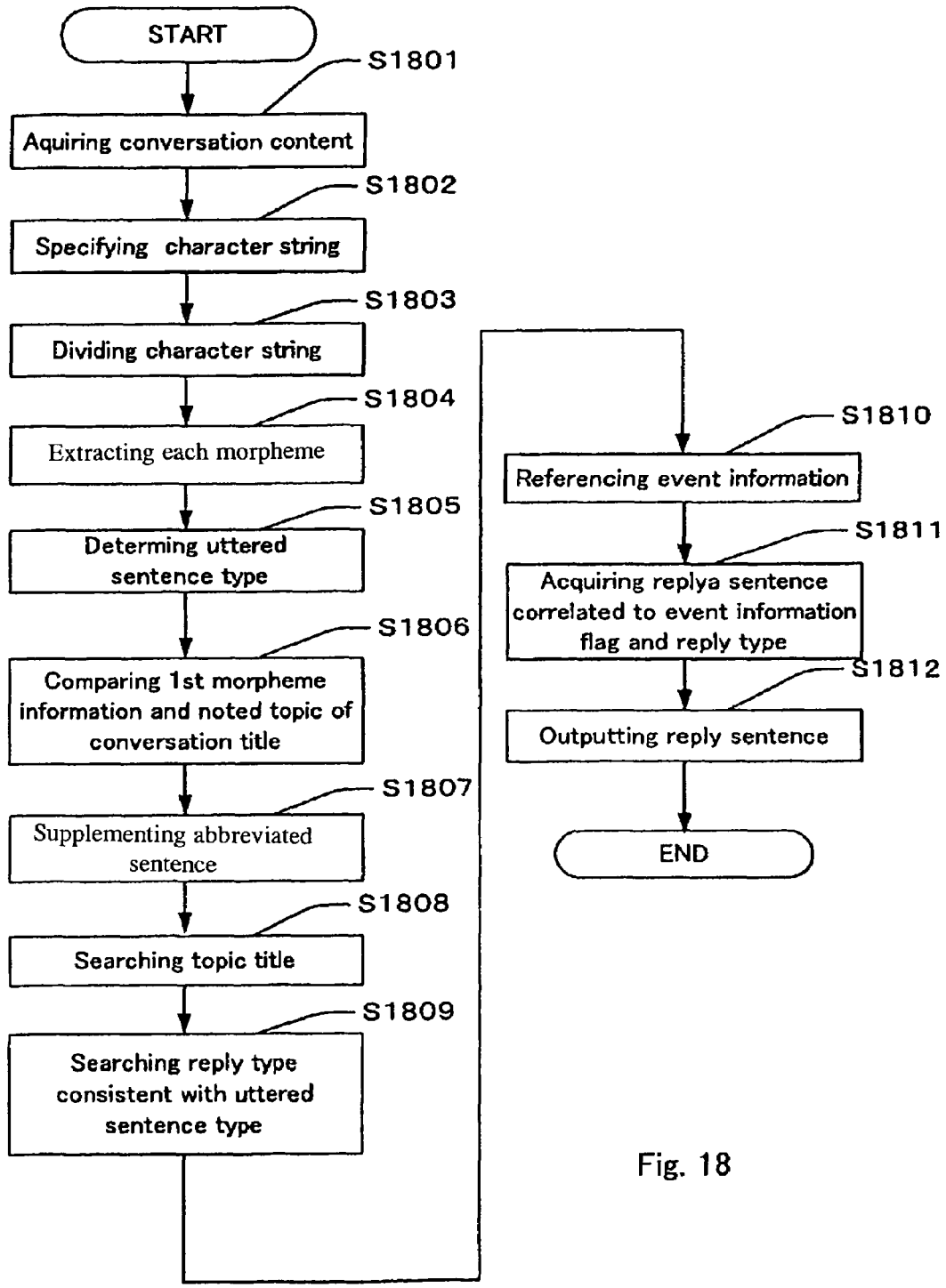
FIG. 18 is a flowchart showing a procedure of a conversation control method.

The conversation control apparatus 1 having the above described structure executes a conversation control method as described in the following. FIG. 18 is a flowchart showing processing flow of a conversation control method of the present invention.

First of all, the input unit 100 executes a step to acquire speech content from a user (step S1801). Specifically, the input unit 100 acquires voice constituting user speech content. The input unit 100 outputs the acquired voice to the voice recognition unit 200 as a voice signal. The input unit 100 can also acquire a character string (for example, character data input in text form) input from a user instead of the voice from the user. In this case, the input unit 100 is not a microphone but a character input device such as a keyboard or a touch panel.

Next, the voice recognition unit 200 executes a step for specifying a character string corresponding to the speech content based on speech content acquired by the input unit 100 (step S1802). Specifically, the voice recognition unit 200 that has been input with the voice signal from the input unit 100 specifies a word assumption (candidate) corresponding to that voice signal based on the input voice signal. The voice recognition unit 200 acquires a character string correlated to the specified word assumption (candidate), and outputs the acquired character string to the conversation control unit 300 as a character string signal.

Then, the character string specifying unit 410 executes a step to divide a continuous character string specified by the voice recognition unit 200 for each sentence step S1803). Specifically, when there is a particular specified time interval or greater between the input of continuous character strings, the character string specifying unit 410, that has been input with the character string signal (or morpheme signal) from the management unit 310, divides the character strings at that interval. The character string specifying unit 410 outputs this divided character string to the morpheme extraction unit 420 and the input type determination unit 440. When the input character string is a character string input from a keyboard, the character string specifying unit 410 can divide the character string at a section such as a punctuation mark or a space.

After that, the morpheme extraction unit 420 executes a step to execute each morpheme constituting the smallest word in the character string as first morpheme information based on the character string specified by the character string specifying unit 410 (step S1804). Specifically, the morpheme extraction unit 420 input with the character string from the character string specifying unit 410 collates the input character string and a morpheme group previously stored in the morpheme database 430. With this embodiment, for each morpheme belonging to respective parts of speech classes, this morpheme group has direction words, readings, parts of speech and activity type etc. for respective morphemes prepared as the previously described morpheme dictionary.

The morpheme extraction unit 420 that has carried out this collation then extracts each morpheme (m1, m2, . . . ) matching each morpheme contained in the previously stored morpheme group from within the input character string. The morpheme extraction unit 420 then outputs each extracted morpheme to the topic specifying information search unit 320 as first morpheme information.

Next, the input type determination unit 440 executes a step to determine "uttered sentence type" based on each morpheme constituting the single sentence specified by the character string specifying unit 410 (step S1805). Specifically, based on the input character string the input type determination unit 440 that has been input with the character string from the character string specifying unit 410 collates that character sting and each dictionary stored in the conversation type database 450 to extract an element relating to each dictionary from within the character string. The input type determination unit 440 that has extracted this element determines which "uttered sentence type" that element belongs to based on the extracted element. The input type determination unit 440 outputs the determined "uttered sentence type" (conversation type) to the reply acquisition unit 350.

The topic specifying information search unit 320 then executes a step to compare the first morpheme information extracted by the morpheme extraction unit 420 and the noted conversation title 820 focus (step S1806).

In the event that the morpheme constituting the first morpheme information and the noted conversation title 820 focus match, the topic specifying information search unit 320 outputs that conversation title 820 to the reply acquisition unit 350. On the other hand, in the event that the morpheme constituting the first morpheme information and the conversation title 820 do not match, the topic specifying information search unit 320 outputs the input first morpheme information and the user input sentence topic specifying information to the abbreviated sentence supplementing unit 330 as a search instruction signal.

After that, based in the first morpheme information input from the topic specifying information search unit 320, the abbreviated sentence supplementing unit 330 executes a step to include the noted conversation title and reply sentence specifying information in the input first morpheme information (step S1807). Specifically, if the first morpheme information is made "W" and a collection of the noted conversation title and the reply specifying information is made "D", the abbreviated sentence supplementing unit 330 includes elements of the conversation topic specifying information "D" in the first morpheme information "W", generates supplemented first morpheme information, this supplemented first morpheme information and all conversation titles 820 correlated to the collection "D", and searches to see if the supplemented first morpheme information and the conversation title 820 match. In the event that there is a conversation title 820 matching the supplemented first morpheme information, the abbreviated sentence supplementing unit 330 outputs that conversation title 820 to the reply acquisition unit 350. On the other hand, in the event that a conversation title 820 matching the supplemented first morpheme information is not found, the abbreviated sentence supplementing unit 330 passes the first morpheme information and the user input sentence topic specifying information to the topic search unit 340.

Next, the topic search unit 340 executes a step to collate the first morpheme information and the user input sentence topic specifying information, and search for a conversation title 820 appropriate to the first morpheme information from within each conversation title 820 (step S1808). Specifically, based on the user input sentence topic specifying information and first morpheme information included in the input search instruction signal, the topic search unit 340 that has been input with the search instruction signal from the abbreviated sentence supplementing unit 330 searches for a conversation title 820 appropriate to that first morpheme information from within each conversation title 820 correlated to the user input sentence topic specifying information. The topic search unit 340 outputs the conversation title 820 that is returned as a result of that search to the reply acquisition unit 350 as a search result signal.

Next, based on a conversation title 820 searched by the topic specifying information search unit 320, the abbreviated sentence supplementing unit 330 or the topic search unit 340, the reply acquisition unit 350 collates user conversation type determined by the sentence analysis unit 400 and each reply type correlated to the conversation title 820 and prepares reply sentence selection (step S1809).

Specifically, the reply acquisition unit 350 that has been input with the search result signal from the topic search unit 340 and "uttered sentence type" from the input type determination unit 440 specifies a reply type that matches "uttered sentence type" (DA) from within the reply type group correlated to that "conversation title" based on the "conversation title" corresponding to the input search result signal and the input "uttered sentence type".

On the other hand, the reply acquisition unit 350 references event information output from the environment recognition unit 800 (step S1810) to acquire the reply sentence 830.

Next, the reply acquisition unit 350 acquires reply sentence 830 correlated to the event information flag 840 that matches event information referenced in step S1810, being a reply sentence 830 corresponding to the reply type specified in step S1809 (step S1811).

Continuing on, the reply acquisition unit 350 outputs the reply sentence 830 acquired in step S1811 to the output unit 600 via the management unit 310. The output unit 600 receiving the reply sentence from the management unit 310 outputs the input reply sentence 830 (step S1812).

As a result of the above described conversation control processing, a reply sentence matching the speech content and reflecting the environment recognition information is output.

3. Advantages

With the conversation control apparatus and conversation control method of this embodiment, since conversation control is carried out based not only on content of the user's speech, but on information acquired from an environment recognition unit 800 (for example, facial recognition, emotion estimation, gender recognition, age recognition, voice pattern recognition, speaker position recognition, etc.), it becomes possible to output a reply according to the conditions of the conversation, and it is possible to broaden the speech content.

4. Second Embodiment

Next, a conversation control apparatus and conversation control method of a second embodiment of the present invention will be described.

In addition to the features of the second embodiment, the conversation control apparatus and conversation control method of the second embodiment reflects emotion of a character portrayed by the conversation control apparatus and/or the emotion of a speaker in a reply sentence.

Figure 19:
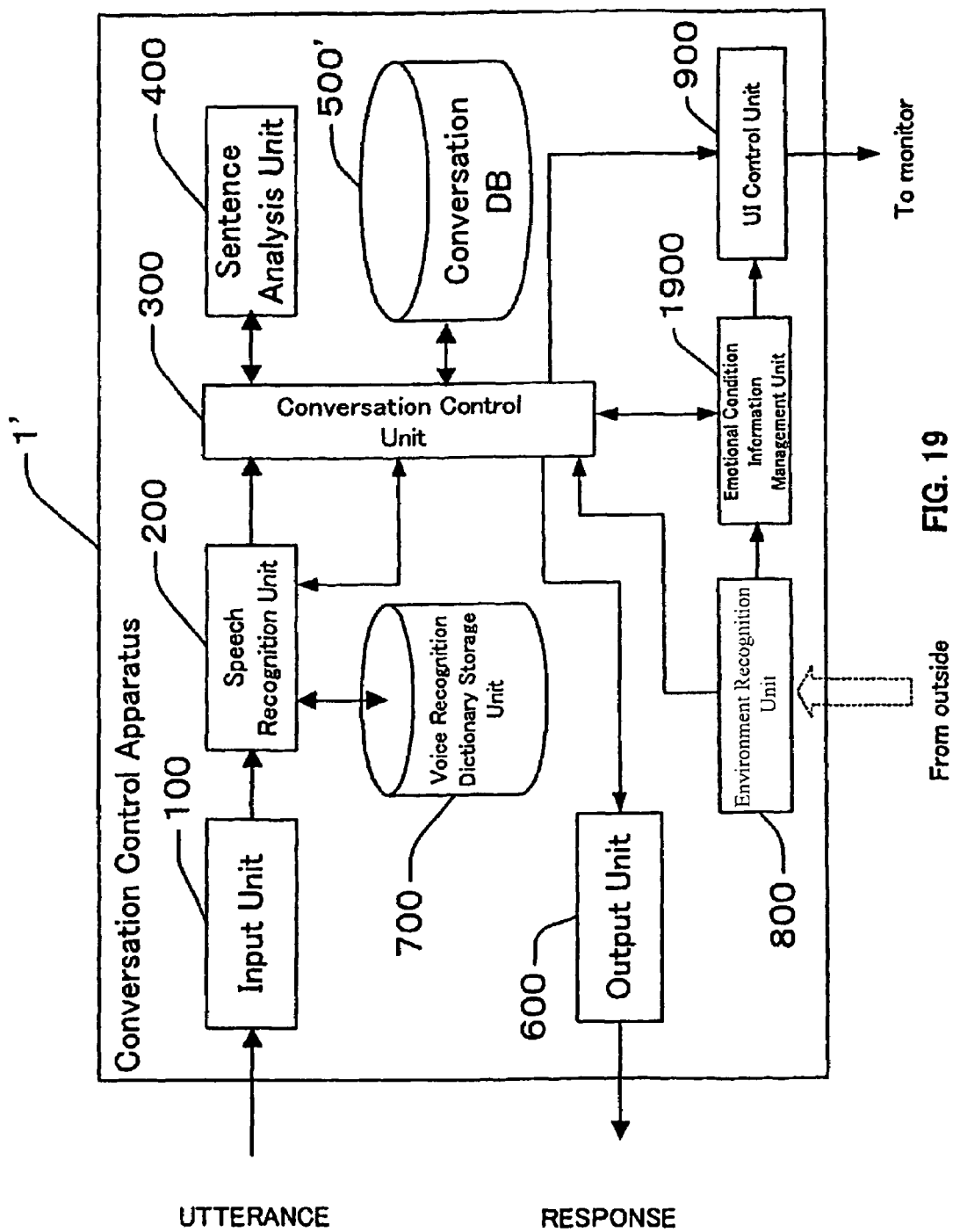
FIG. 19 is a functional block diagram showing an example of the structure of a conversation control apparatus of a second embodiment.

FIG. 19 is a functional block diagram showing a structural example of a conversation control apparatus of the second embodiment.

The conversation control apparatus 1' of the second embodiment is the same as the conversation control apparatus 1 of the first embodiment except for the following points, and so only points of difference will be described and description of points that are the same is omitted.

The conversation control apparatus 1' also has an emotional condition information management unit 1900 for managing emotional condition information representing the emotion of a character portrayed by the conversation control apparatus and/or the emotion of a speaker.

The emotional condition information management unit 1900 receives am emotion flag output from the conversation control unit 300 and carries out processing to cause the emotion flag to be reflected in emotional condition information (called "character emotional condition information") representing the emotion of a character, returns actual character emotional condition information to the conversation control unit 300 and causes outputs of a reply sentence 830 in response to the character emotional condition information. Also, the emotional condition information management unit 1900 receives event information relating to emotion of a speaker from the environment recognition unit 800, generates emotional condition information (called "speaker emotional condition information") representing the emotion of the speaker based on this event information, stores and updated the emotional condition information, returns the speaker emotional condition information to the conversation control unit 300 and causes output of a reply sentence 830 in response to the speaker emotional condition information.

The character emotion is described using character emotional condition information. The character emotional condition information can also be information that can accumulatively store information representing emotion, and it is possible to use, for example, an accumulated value for emotion flag as the character emotional condition information.

It is also possible for the emotion flag to use any data as long as it is possible to classify emotion, for example, allocating character data "A" to an emotion flag representing the emotion "normal", allocating character data "B" to an emotion flag representing the emotion "angry", allocating character data "C" to an emotion flag representing the emotion "furious", and allocating character data "D" to an emotion flag representing the emotion "happy". The conversation control unit 300 of this embodiment references stored character emotional condition information based on this emotion flag, and controls emotion of the character (pseudo character, virtual character) provided by the conversation control apparatus 1'.

FIG. 20(A) shows an example of a data structure for character emotional condition information stored by the emotional condition information management unit 1900, while FIG. 20 (B) shows an example of a data structure for speaker emotional condition information stored by the emotional condition information management unit 1900.

Character emotional condition information 2000 has an accumulative value 2002 for every emotion flag type 2001. The accumulative value 2002 can be increased or decreased for each emotion flag. For example, for every receipt of an emotion flag representing "happy" by the emotional condition information management unit 1900, the value of the accumulative value 2002 corresponding to the emotion flag type "happy" is incremented.

Speaker emotional condition information 2003 has a single records 2005A, 2005B, 2005C, . . . for every speaker so as to be able to described the respective emotions of a plurality of users, with the records 2005A, 2005B, 2005C respectively having an "angry" field 2004A, a "hatred" field 2004B, a "fear" field 2004C, a "happy" field 2004D, a "sad" field 2004E and a "surprised" field 2004F so as to correspond to six basic emotions of a speaker.

Data of "0" or "1" is stored in each of the fields 2004A-2004F, with "0" representing that there is no basic emotion corresponding to the speaker, and "1" representing that there is a basic emotion corresponding to the user. For example, in the event that event information representing "happy", "surprised", being event information representing speaker emotion estimated by the environment recognition unit 800, the emotional condition information management unit 1900 stores "1" in the "happy" field 1004D and the "surprised" field 2004D of the record for that user, and stores "0" in the other fields 2004A, 2004B, 2004C and 2004E.

In, it becomes possible to sequentially store emotion for the speaker (by estimation) by updating the speaker emotional condition information in accordance with this type of event information. In FIG. 20B, "9" is stored in the fields 2004A-2004F for speaker 3, but this speaker 3 does not exist which represents that this record is not yet used.

Also, the emotional condition information management unit 1900 passes the emotional condition information to a user interface control unit 900, and user interface control unit 900 displays the expression on the face and movement etc. of a character on a liquid crystal display based on the emotional condition information. Since the emotion and movement etc. of a character are displayed in accordance with the content of the reply sentence 830 in this way, the user of the conversation control apparatus 1' has the sensation that a character (pseudo character, virtual character) portrayed by the conversation control apparatus 1' is displayed very naturally, like an actual person.

Figure 21:
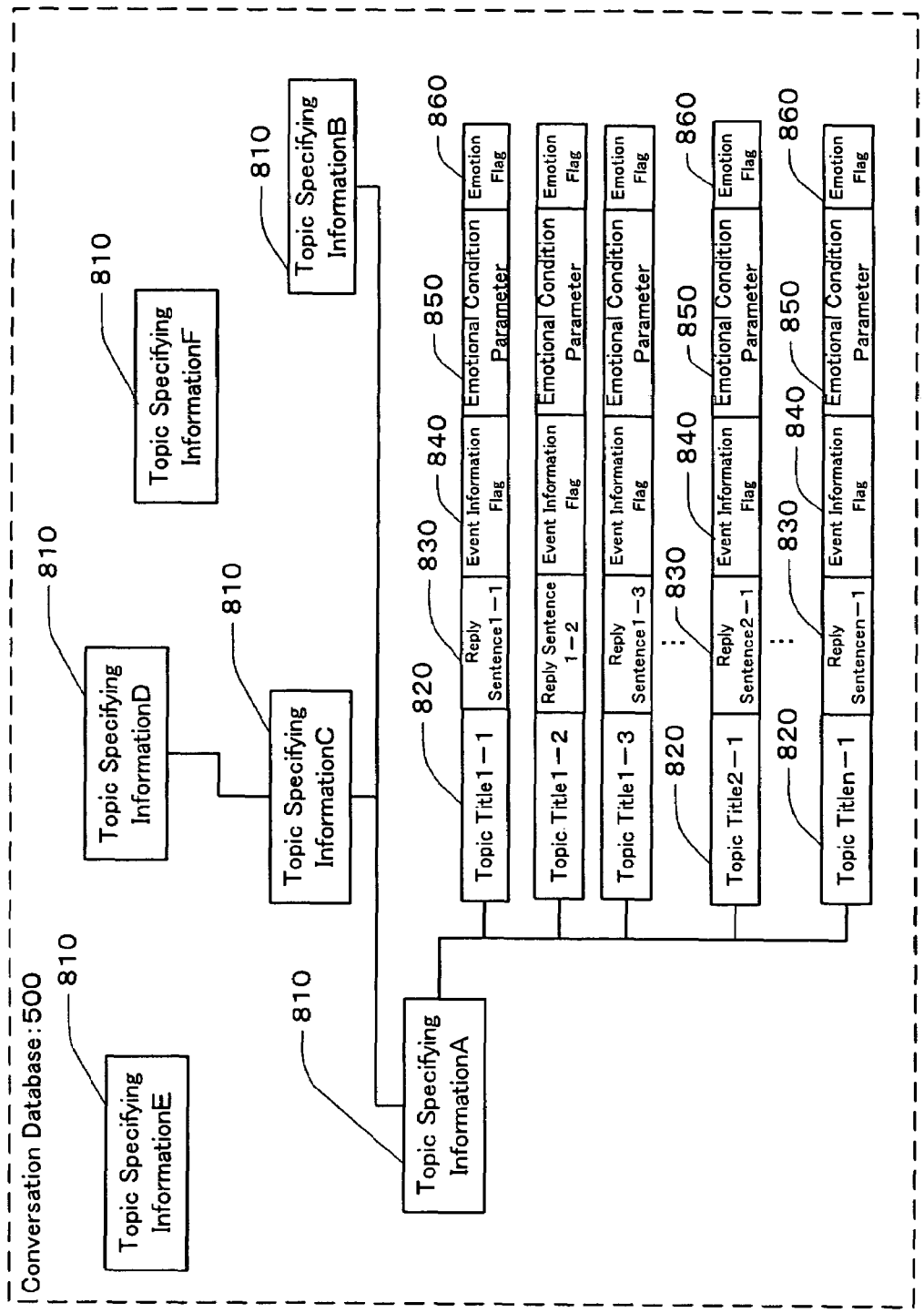
FIG. 21 is a drawing showing an example of stored content in a conversation database of the second embodiment.

Next, stored content of the conversation database 500' of this embodiment will be described. FIG. 21 is a drawing showing an example of stored content of the conversation database 500' of this embodiment. The stored content of the conversation database 500' of this embodiment is almost the same as the stored content shown in FIG. 10, but is different in that it also has the emotional condition parameter 850 correlated to the conversation title 820 and the emotion flag 860.

The emotional condition parameter 850 is correlated to each reply sentence 830. The emotional condition parameter 850 is information representing conditions for the emotional condition information. For example, when the emotional condition information shows accumulative value "10" for the "angry" emotion flag, it is defined that the emotional condition parameter 850 for a particular reply sentence "A" has an accumulative value for the "angry" emotion flag of 5 or less, while on the other hand if the emotional condition parameter 850 for another reply sentence "B" has an accumulative value of 8 or more for the "angry" emotion flag the reply sentence "A" is not selected, and the reply sentence "B" is selected by the conversation control apparatus 1' as a reply to the user.

Further, an emotion flag 860, being data representing emotion of a character (pseudo character) provided by the conversation control apparatus 1' is correlated to the reply sentence 830 and stored. The emotion flag 860 may be any data as long as it is information enabling classification of emotion, for example, allocating character data "A" to an emotion flag representing the emotion "normal", allocating character data "B" to an emotion flag representing the emotion "angry", allocating character data "C" to an emotion flag representing the emotion "furious", and allocating character data "D" to an emotion flag representing the emotion "happy". The conversation control apparatus 1' of this embodiment compares emotional condition information stored in the emotional condition information management unit 1900 and this emotion flag 860, and selects a reply sentence having an emotion flag 860 that matches the stored emotional condition information to control the emotion of a character (pseudo character) provided by the conversation control apparatus 1'.

With this embodiment, the event information flag 840, emotional condition parameter 850 and emotion flag 860 are correlated to the reply sentence 830, but the present invention is achieved even if they are correlated to the conversation title 820 and conversation topic specifying information 810.

Figure 22:
FIG. 22 is a drawing showing specific examples of conversation titles affixed with particular topic specifying information, reply sentences, event information flags, emotional condition parameters and emotion flags.

FIG. 22 shows a specific example of the conversation title 820, reply sentence 830, event information flag 840, emotional condition parameter 850 and emotion flag 860 correlated to the conversation topic specifying information 810 "Japanese food" of this embodiment.

A plurality of conversation titles (820) 1-1, 1-2, ... are correlated to the conversation specifying information 810 "Japanese food". Reply sentences (830) 1-1, 1-2, ... are correlated to respective conversation titles (820) 101, 1-2, ... and stored. Each reply sentence 830 is made up of a plurality of sentence prepared for every reply type, event information flag 840, emotional condition parameter 850 and emotion flag 860.

For example, in the event that the conversation title (820) 1-1 is (Japanese food; *; like) {this has extracted a morpheme included in "I like Japanese food."}, for the case where the reply type is DA (declaration affirmative sentence) "Provides various tasty Japanese dishes" (reply for the case where event information flag 840 indicates that user estimated emotion is "happy", user estimated gender is "male", emotion condition parameter 850 is "all 2 or less" and emotion flag 860 is "A"), "Provides extremely healthy Japanese food." (reply for the case where event information flag 840 indicates that user estimated emotion is "happy", user estimated gender is "female" emotion condition parameter 850 is "all 2 or less" and emotion flag 860 is "A") etc. are prepared in the reply sentence (830) 1-1 corresponding to that conversation title (820), and for the case where the reply type is TA (time affirmative) "Also provides Japanese dishes that can be served quickly." (reply for the case where event information flag 840 indicates that user estimated emotion is "happy", user estimated gender is "male", emotion condition parameter 850 is "all 2 or less" and emotion flag 860 is "A"), "Also provides healthy Japanese dishes that can be served quickly." (reply for the case where event information flag 840 indicates that user estimated emotion is "happy", user estimated gender is "female", emotion condition parameter 850 is "all 2 or less" and emotion flag 860 is "A") etc. are prepared. A plurality of replies correlated to the event information flag 840 are also prepared for other conversation types. The reply acquisition unit 350, which will be described later, acquired a single reply 830 correlated to that conversation title 820 according to the event information flag 840, emotion condition parameter 850 and emotion flag 860.

5. Operation of Conversation Control Apparatus (Conversation Control Method)

Figure 23:
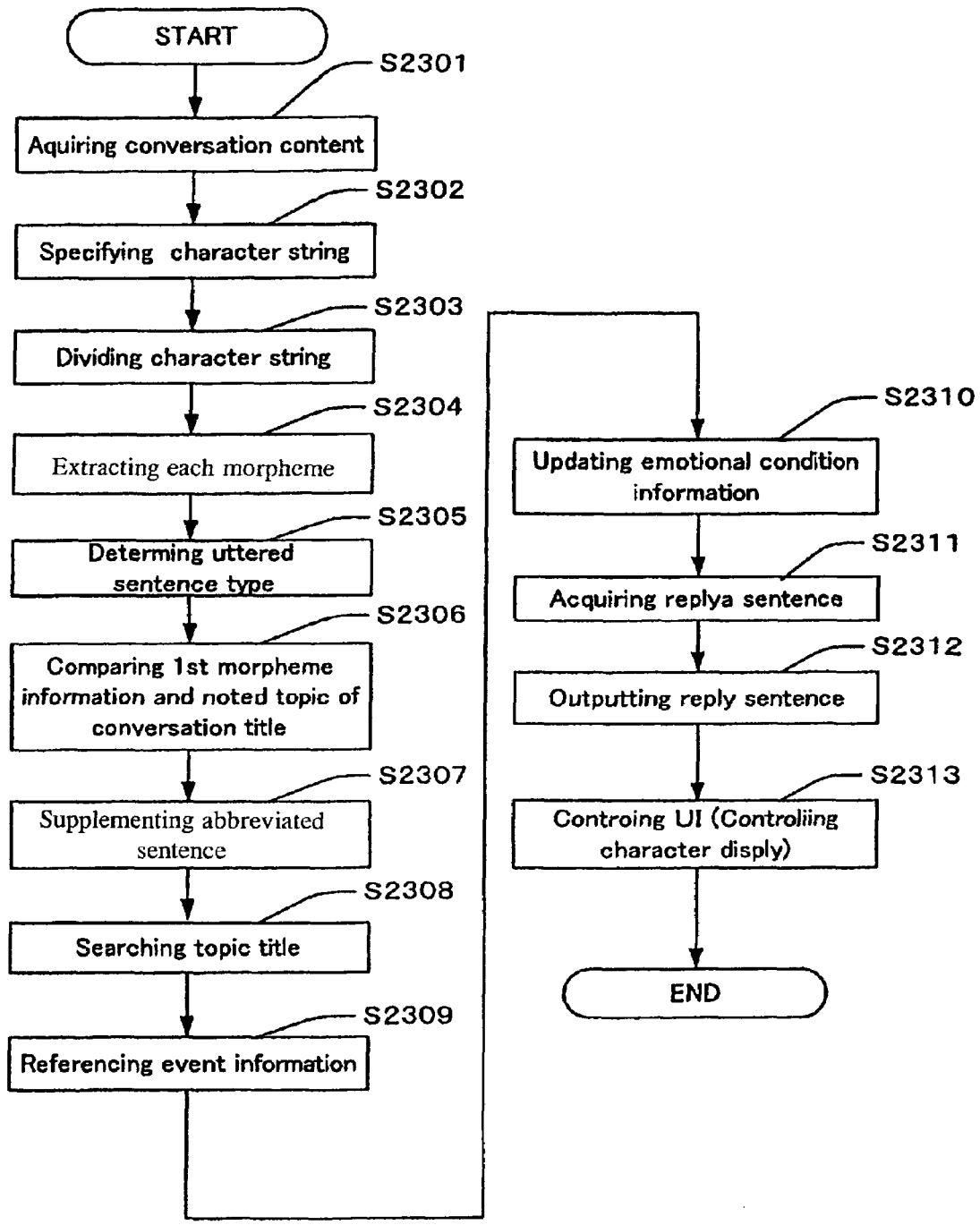
FIG. 23 is a flowchart showing a procedure of a conversation control method of the second embodiment.

Next a description will be given of an operational example the conversation control apparatus 1' of this embodiment with reference to FIG. 23. FIG. 23 is a flowchart for a conversation control method carried out as a result of operation of the conversation control apparatus 1'.

In the operation shown in FIG. 23, processing is the same as for the operation example of the first embodiment (FIG. 18, from step 1801 to step 1809) up to from processing to acquire speech content (step S2301) to processing to reference the event information flag (step S2309). Each step from step S2301 to step S2309 described above will be described.

After completion of processing to reference the event information flag (step S2309), the conversation control apparatus 1' carries update of the emotional condition information (step S2310). Here, processing is carried out to update the speaker emotional condition information 2003 based mainly on the event information (event information representing estimated emotion of the speaker). The updated emotional condition information is stored in the emotional condition information management unit 1900.

Next, based on latest event information output from the environment recognition unit 800, emotional condition information stored in the emotional condition information management unit 1900, and conversation topic title retrieved in step S2308, the conversation control apparatus 1' acquires a reply sentence from the conversation database, which matches those information items (step S2311).

Next, the conversation control apparatus 1' outputs the acquired reply sentence 830 (step S2312). The reply sentence 830 can also be output as voice from speakers 15L, 15R, or displayed as character information on a liquid crystal display unit 11. Content of the reply sentence 830 is stored corresponding to event information generated using the environment in the vicinity of the conversation control apparatus 1' or speaker emotion and or character emotion, which means that it is possible to output a response that is appropriate the conditions where the conversation is taking place.

Next, the conversation control apparatus 1' carries out control of a user interface including character display control in response to the reply acquired in step S2311 (step S2313). With this embodiment, the emotion flag 860 corresponding to the reply sentence 830 is referenced, a character (image/voice data for realizing character emotion, such as character emotion and movement) corresponding to that emotion flag 860 is selected, and user interface control is carried out by causing display on the liquid crystal display unit 11, but this embodiment is also achieved if user interface control is carried out by referencing the character emotional condition information stored in the emotional condition information management unit 1900.

In the above, a sequence of processing from a user conversation up to output of the reply by the conversation control apparatus 1' is completed. The conversation control apparatus 1' executes the above described step S2301 to step S2313 for every receipt of user speech, and handles a conversation (information exchange) between the user and the conversation control apparatus 1'.

6. Advantages

The conversation control apparatus 1' and conversation control method of this embodiment have the advantages that they reflect emotional changes of a character, and make it possible to output a reply that is appropriate to conditions the conversation takes place under.

7. Others (1). The structure and operation of the voice recognition unit 200, conversation control unit 300 and sentence analyzing unit 400 of the conversation control apparatus 1 and conversation control apparatus 1' are not limited, and it is possible to use the structural elements of the conversation control apparatus 1 and conversation control apparatus 1' of the present invention even if voice recognition unit 200, conversation control unit 300 and sentence analyzing unit 400 that are different from those described above in the first embodiment are adopted, as long as a reply corresponding to the content of a speaker's conversation is returned using a conversation database.

(2) With the above described embodiments, input of conversation to the conversation control apparatus 1 and conversation control apparatus 1' has been described using voice, but input of conversation to the conversation control apparatus 1 and conversation control apparatus 1' is not limited to voice, and it is also possible to use character string data input using character input mean such as a keyboard, touch panel, pointing device etc., and to have a structure where a reply sentence is output using a conversation database 500 containing conversations input as character strings.

Additional advantages and modifications will readily occur to those skilled in the art. Therefore, the invention in its broader aspects is not limited to the specific details or representative embodiments shown and described herein. Accordingly, various modifications may be made without departing from the spirit or scope of the general inventive concept as defined by the appended claims and their equivalents.

What is claimed is:

1. A conversation control apparatus, comprising:
   (a) a conversation database having stored therein:
      a plurality of topic specifying information items;
      a plurality of topic titles including sub-pluralities respectively correlated to correspond to respective ones of said topic specifying information items;
      a plurality of reply sentences including sub-pluralities each respectively correlated to correspond to a respective one of said topic titles; and
      a plurality of event information flags each corresponding to an emotion and including sub-pluralities each correlated to correspond to a respective one of said reply sentences;
   (b) a voice input unit configured to receive speech input of a user;
   (c) a sensor unit configured to acquire facial image data of the user;
   (d) an emotion estimation module configured to estimate a current emotion of the user, based upon a characteristic quantity of an expression computed from the facial image data of the user acquired by the sensor unit, and to generate event information indicative of a result of the estimate;
   (e) a past conversation information storage unit storing a plurality of past conversation information items determined based upon a past speech by the user and a past reply sentence in response to the past speech, the past reply sentence having been output by the conversation control apparatus;
   (f) an output unit configured to output sentences; and
   (g) a conversation control unit, the conversation control unit being configured to execute the following operations:
      (i) accept the speech input received by the voice input unit from the user as current conversation information and store the current conversation information for future use as the past conversation information of the user in the past conversation information storage unit;
      (ii) acquire the facial image data of the user, who uttered the speech input, and generate by the emotion estimation module, the event information used for estimating the current emotion of the user, based upon the acquired facial image data of the user;
      (iii) extract a relevant conversation information item, from among the plurality of the past conversation information items stored in the past conversation information storage unit, based upon the current conversation information of the user accepted in operation (i);

(iv) extract a relevant topic specifying information item, from among the plurality of the topic specifying information items stored in the conversation database unit, based upon the relevant conversation information item extracted in the operation (iii);

(v) extract a relevant topic title, from among the plurality of the topic titles determined as relevant based on corresponding to the relevant topic specifying information item extracted in the operation (iv) which was extracted based on the current conversation information of the user input in the operation (i), and also to select one of the sub-plurality of reply sentences by determining correlation thereof to the relevant topic title;

(vi) extract a relevant event information flag, from among the sub-plurality of the event information flags correlated to the selected one of the sub-plurality of reply sentences correlated to the relevant topic tide extracted in the operation (v), based upon the event information indicative of the current emotion of the user and generated in the operation (ii) by the emotion estimation module;

(vii) extract a relevant reply sentence from the sub-plurality of reply sentences correlated to the relevant topic title extracted in the operation (v), by determining the relevant reply sentence corresponds to the relevant event information flag extracted in the operation (vi), such that said relevant reply sentence is extracted based upon all of the following:

the current conversation information of the user accepted in operation (i) being used to extract the relevant conversation information item which in turn is used to extract the relevant topic specifying information item which is then used to extract the relevant topic title which is then used to select the sub-plurality of reply sentences;

the past speech by the user and the past reply sentence issued in response to the past speech being used to provide the past conversation information from which the relevant conversation information item is extracted; and outside information in the form of the facial image data of the user based upon which the event information is generated and used to extract the relevant reply sentence from the selected sub-plurality of reply sentences by confirming the event information flag of the reply sentence relates to the event information; and (viii) output the relevant reply sentence, extracted in the operation (vii), to the user.

2. The conversation control apparatus according to claim 1, further comprising:

an emotional condition information management unit configured to store emotional condition information of a predetermined character;

a display unit for displaying the predetermined character;

the emotional condition information management unit being further configured to:

receive the event information indicative of the current emotion of the user generated in operation (ii) by the emotion estimation module; and update the emotional condition information of the predetermined character so that the current emotion of the user is reflected in the predetermined character, based upon the event information received and indicative of the current emotion of the user; and the display unit being configured to display a motion and an expression of the predetermined character as a function of the emotional condition information last updated by the emotional condition information management unit.

3. A method of effecting conversation control using a conversation control apparatus, comprising:

(a) providing a conversation database having stored therein:

a plurality of topic specifying information items;

a plurality of topic titles including sub-pluralities respectively correlated to correspond to respective ones of said topic specifying information items;

a plurality of reply sentences including sub-pluralities each respectively correlated to correspond to a respective one of said topic tides; and a plurality of event information flags each corresponding to an emotion and including sub-pluralities each correlated to correspond to a respective one of said reply sentences;

(b) providing a voice input unit configured to receive speech input of a user;

(c) a sensor unit configured to acquire facial image data of the user;

(d) providing an emotion estimation module configured to estimate a current emotion of the user, based upon a characteristic quantity of an expression computed from the facial image data of the user acquired by the sensor unit, and to generate event information indicative of a result of the estimate;

(e) providing a past conversation information storage unit storing a plurality of past conversation information items determined based upon a past speech by the user and a past reply sentence in response to the past speech, the past reply sentence having been output by the conversation control apparatus;

(f) providing an output unit configured to output sentences; and (g) executing the following operations:

(i) accepting speech input received by the voice input unit from the user as current conversation information and storing the current conversation information for future use as the past conversation information of the user in the past conversation information storage unit;

(ii) acquiring the facial image data of the user, who uttered the speech input, and generating by the emotion estimation module, the event information used for estimating the current emotion of the user, based upon the acquired facial image data of the user;

(iii) extracting a relevant conversation information item from among the plurality of the past conversation information items stored in the past conversation information storage unit, based upon the current conversation information of the user accepted in operation (i);

(iv) extracting a relevant topic specifying information item from among the plurality of the topic specifying information items stored in the conversation database unit, based upon the relevant conversation information item extracted in the operation (iii);

(v) extracting a relevant topic tide from among the plurality of the topic titles by determining relevancy based on correspondence to the relevant topic specifying information item extracted in the operation (iv) which was extracted based on the current conversation information of the user input in the operation (i), and also selecting one of the sub-plurality of reply sentences by determining correlation thereof to the relevant topic title;

(vi) extracting a relevant event information flag, from among the sub-plurality of the event information flags correlated to the selected one of the sub-plurality of reply sentences correlated to the relevant topic title extracted in the operation (v), based upon the event information indicative of the current emotion of the user and generated in the operation (ii) by the emotion estimation module;

(vii) extracting a relevant reply sentence from the sub-plurality of reply sentences correlated to the relevant topic title extracted in the operation (v), by determining the relevant reply sentence corresponds to the relevant event information flag extracted in the operation (vi), such that said relevant reply sentence is extracted based upon all of the following:

the current conversation information of the user accepted in operation (i) being used to extract the relevant conversation information item which in turn is used to extract the relevant topic specifying information item which is then used to extract the relevant topic title which is then used to select the sub-plurality of reply sentences;

the past speech by the user and the past reply sentence issued m response to the past speech being used to provide the past conversation information from which the relevant conversation information item is extracted; and outside information in the form of the facial image data of the user based upon which the event information is generated and used to extract the relevant reply sentence from the selected sub-plurality of reply sentences by confirming the event information flag of the reply sentence relates to the event information; and (viii) outputting the relevant reply sentence, extracted in the operation (vii), to the user.

4. The method according to claim 1, further comprising:

storing emotional condition information of a predetermined character;

receive the event information indicative of the current emotion of the user generated in operation (ii); and updating the emotional condition information of the predetermined character so that the current emotion of the user is reflected in the predetermined character, based upon the event information received and indicative of the current emotion of the user; and displaying the predetermined character on a display unit, said displaying including displaying a motion and an expression of the predetermined character as a function of the emotional condition information last updated.

* * * * *